(12) United States Patent
Sugimoto et al.

(10) Patent No.: US 9,855,798 B2
(45) Date of Patent: *Jan. 2, 2018

(54) PNEUMATIC TIRE

(75) Inventors: Mutsuki Sugimoto, Kobe (JP);
Tsuyoshi Tsuchida, Kobe (JP);
Tomomi Masui, Kobe (JP); Reika Otake, Kobe (JP)

(73) Assignee: SUMITOMO RUBBER INDUSTRIES, LTD., Kobe-Shi, Hyogo (JP)

(*) Notice: Subject to any disclaimer, the term of this patent is extended or adjusted under 35 U.S.C. 154(b) by 247 days.

This patent is subject to a terminal disclaimer.

(21) Appl. No.: 14/130,109

(22) PCT Filed: Apr. 10, 2012

(86) PCT No.: PCT/JP2012/059781
§ 371 (c)(1),
(2), (4) Date: Dec. 30, 2013

(87) PCT Pub. No.: WO2013/014983
PCT Pub. Date: Jan. 31, 2013

(65) Prior Publication Data
US 2014/0138005 A1    May 22, 2014

(30) Foreign Application Priority Data

Jul. 28, 2011 (JP) ................................. 2011-165656
Sep. 7, 2011 (JP) ................................. 2011-194696
Sep. 14, 2011 (JP) ................................. 2011-200746

(51) Int. Cl.
*B60C 1/00* (2006.01)
*B60C 5/14* (2006.01)
(Continued)

(52) U.S. Cl.
CPC .............. *B60C 5/14* (2013.01); *B29C 47/003* (2013.01); *B29C 47/0021* (2013.01);
(Continued)

(58) Field of Classification Search
CPC ............ B60C 1/008; B60C 5/14; B60C 5/142
See application file for complete search history.

(56) References Cited

U.S. PATENT DOCUMENTS 4,569,382 A    2/1986  Maxey et al.
4,910,321 A    3/1990  Kennedy et al.
(Continued)

FOREIGN PATENT DOCUMENTS

CN    1769331 A      5/2006
CN    101743135 A    6/2010
(Continued)

OTHER PUBLICATIONS

Extended European Search Report, dated May 4, 2015, for European Application No. 12817409.1.
(Continued)

*Primary Examiner* — Justin Fischer
(74) *Attorney, Agent, or Firm* — Birch, Stewart, Kolasch & Birch, LLP

(57) ABSTRACT

The inner liner is composed of a polymer layer stack including a first layer containing an SIBS and a second layer containing at least one of an SIS and an SIB. At least one of the first layer and the second layer is a polymer composition containing one of a C4 polymer obtained by polymerizing a monomer unit having 4 carbon atoms, a layered clay mineral with an organic compound intercalated therein and at least one kind of rubber component selected from the group consisting of a natural rubber, an isoprene rubber and a butyl rubber. The second layer is arranged to come into contact with a rubber layer of the carcass ply. The inner liner has a
(Continued)

thickness Ge at a shoulder position Pe exceeding 100% and being less than or equal to 500% of a thickness Gc at a crown central position Pc.

7 Claims, 3 Drawing Sheets

(51) Int. Cl.
| | |
|---|---|
| *B32B 25/08* | (2006.01) |
| *B32B 25/18* | (2006.01) |
| *B32B 27/08* | (2006.01) |
| *B32B 27/30* | (2006.01) |
| *B29C 47/88* | (2006.01) |
| *B29C 47/92* | (2006.01) |
| *B29D 30/06* | (2006.01) |
| *C08L 53/00* | (2006.01) |
| *B29C 47/00* | (2006.01) |
| *B29C 47/14* | (2006.01) |

(52) U.S. Cl.
CPC .......... *B29C 47/8805* (2013.01); *B29C 47/92* (2013.01); *B29D 30/0681* (2013.01); *B32B 25/08* (2013.01); *B32B 25/18* (2013.01); *B32B 27/08* (2013.01); *B32B 27/302* (2013.01); *B60C 1/0008* (2013.01); *C08L 53/00* (2013.01); *B29C 47/14* (2013.01); *B29C 2947/9259* (2013.01); *B29C 2947/92704* (2013.01); *B29C 2947/92714* (2013.01); *B29C 2947/92857* (2013.01); *B29D 2030/0682* (2013.01); *B32B 2274/00* (2013.01); *B32B 2307/54* (2013.01); *B32B 2307/724* (2013.01); *B32B 2605/08* (2013.01); *B60C 2005/145* (2013.01)

(56) References Cited

U.S. PATENT DOCUMENTS

| | | | |
|---|---|---|---|
| 4,946,899 A | 8/1990 | Kennedy et al. | |
| 5,219,948 A | 6/1993 | Storey et al. | |
| 5,447,976 A | 9/1995 | Curtin et al. | |
| 5,992,486 A | 11/1999 | Katsuki et al. | |
| 6,079,465 A | 6/2000 | Takeyama et al. | |
| 7,927,695 B2 | 4/2011 | Raulie | |
| 8,656,973 B2 * | 2/2014 | Sugimoto | B60C 1/0008 152/510 |
| 9,259,969 B2 * | 2/2016 | Nakazono | B32B 25/14 |
| 2004/0030036 A1 | 2/2004 | Waddell et al. | |
| 2005/0148718 A1 | 7/2005 | Ishida et al. | |
| 2006/0094815 A1 | 5/2006 | Kunisawa et al. | |
| 2006/0142463 A1 | 6/2006 | Ishida et al. | |
| 2006/0229402 A1 | 10/2006 | Varma | |
| 2007/0137753 A1 | 6/2007 | Hirayama et al. | |
| 2008/0249236 A1 | 10/2008 | Nakashima et al. | |
| 2010/0175804 A1 | 7/2010 | Lesage et al. | |
| 2010/0230026 A1 | 9/2010 | Yamazaki | |
| 2010/0294411 A1 | 11/2010 | Custodero et al. | |
| 2011/0011511 A1 | 1/2011 | Miyazaki et al. | |
| 2011/0056604 A1 * | 3/2011 | Sugimoto | B29D 30/0681 152/510 |
| 2011/0060082 A1 | 3/2011 | Sugimoto | |
| 2011/0077357 A1 | 3/2011 | Sugimoto | |
| 2012/0003413 A1 | 1/2012 | Lesage et al. | |
| 2012/0006459 A1 | 1/2012 | Sugimoto et al. | |
| 2012/0016056 A1 | 1/2012 | Miyazaki | |
| 2012/0024447 A1 | 2/2012 | Sugimoto | |
| 2012/0156400 A1 | 6/2012 | Abad et al. | |
| 2012/0315408 A1 | 12/2012 | Chouvel et al. | |
| 2013/0220519 A1 | 8/2013 | Sugimoto | |
| 2013/0230697 A1 | 9/2013 | Sugimoto | |

FOREIGN PATENT DOCUMENTS

| | | |
|---|---|---|
| CN | 102009511 A | 4/2011 |
| CN | 102010561 A | 4/2011 |
| CN | 102239048 A | 11/2011 |
| EP | 0 206 756 A2 | 12/1986 |
| EP | 0397081 A2 | 11/1990 |
| EP | 0 265 053 B1 | 10/1996 |
| EP | 2402175 A1 | 1/2012 |
| EP | 2415617 A1 | 2/2012 |
| FR | 2916679 A1 | 12/2008 |
| FR | 2917010 A1 | 12/2008 |
| FR | 2939076 * | 6/2010 |
| GB | 1190766 * | 5/1970 |
| JP | 62-048704 A | 3/1987 |
| JP | 64-062308 A | 3/1989 |
| JP | 3-174403 A | 7/1991 |
| JP | 9-019987 A | 1/1997 |
| JP | 9-165469 A | 6/1997 |
| JP | 11-59120 A | 3/1999 |
| JP | 2999188 B1 | 1/2000 |
| JP | 2001-279051 A | 10/2001 |
| JP | 2003-306579 A | 10/2003 |
| JP | 2004-90589 A | 3/2004 |
| JP | 2005-343379 A | 12/2005 |
| JP | 2007-326909 A | 12/2007 |
| JP | 2008-024219 A | 2/2008 |
| JP | 2008-127443 A | 6/2008 |
| JP | 2009-173051 A | 8/2009 |
| JP | 2009-287020 A | 12/2009 |
| JP | 2010-13646 A | 1/2010 |
| JP | 2010-100675 A | 5/2010 |
| JP | 2010-144039 A | 7/2010 |
| JP | 2011-051320 A | 3/2011 |
| JP | 2011-057788 A | 3/2011 |
| JP | 2011-57940 A | 3/2011 |
| JP | 2011-074237 A | 4/2011 |
| JP | 2011-246527 A | 12/2011 |
| JP | 2012-36370 A | 2/2012 |
| JP | 2012-51150 A | 3/2012 |
| JP | 2012-51544 A | 3/2012 |
| JP | 2012-122050 A | 6/2012 |
| WO | WO 2005/033035 A1 | 4/2005 |
| WO | WO 2008/154996 A1 | 12/2008 |
| WO | WO 2009/119232 A1 | 10/2009 |
| WO | WO 2010/063427 A1 | 6/2010 |
| WO | WO 2011/076801 A1 | 6/2011 |
| WO | WO 2012/066816 A1 | 5/2012 |
| WO | WO 2012/077372 A1 | 6/2012 |

OTHER PUBLICATIONS

Chinese Office Action, dated Oct. 8, 2015, for Chinese Application No. 201280037931.8, with an English translation.
Tong et al. (editors), "Handbook of Chemical Products (5th Edition) Resins and Plastics," Chemical Industry Press, Aug. 31, 2008, pp. 145-146 (six pages provided).
International Search Report issued in PCT/JP2012/059781, dated Jul. 10, 2012.
Chinese Notice of Allowance and Search Report issued in Chinese Application No. 201280037931.8 dated Mar. 16, 2017, together with an English translation of the Chinese Notice of Allowance.
Chinese Office Action and Search Report issued in Chinese Application No. 201380043899.9 dated Jul. 19, 2016, together with an English translation of the Chinese Office Action.
Chinese Office Action issued in Chinese Application No. 201380043899.9 dated Jan. 5, 2017, together with an English translation thereof.
Extended European Search Report issued in European Application No. 13836813.9 dated Mar. 7, 2016.

* cited by examiner

PNEUMATIC TIRE

TECHNICAL FIELD

The present invention relates to a pneumatic tire including an inner liner having different thicknesses on the tire inside.

BACKGROUND ART

The inner liner is disposed inwardly in a tire, and has a function of reducing an amount of leakage of air from inside to outside of the pneumatic tire to maintain tire internal pressure constant. As a material having such a function, a rubber composition having low air permeability, such as a butyl rubber, is conventionally used. On the other hand, in order to achieve weight reduction of a tire, a film made of a material containing a thermoplastic resin is used in some cases, instead of the above-described rubber composition.

Here, during use of the tire, large shear strain acts on a vicinity of a shoulder portion in the inner liner. When the material including the thermoplastic resin is used as the inner liner, this shear strain is likely to cause detachment at an adhesion interface between the inner liner and the carcass ply, with the result that air leakage takes place from the tire, disadvantageously.

On the other hand, low fuel consumption is demanded of a pneumatic tire, and reduction in rolling resistance by means of weight reduction of the tire is an issue. Therefore, a technique also has been proposed to employ a thermoplastic elastomer for the inner liner. However, when the inner liner of an elastomer is made thinner in thickness than that of a butyl rubber, it is difficult to achieve improved air permeability resistance and reduced weight at the same time. Moreover, reduction in thickness disadvantageously results in reduction in strength of the inner liner and damage or deformation of the inner liner due to heat and pressure of a bladder during a vulcanization step.

PTD 1 (Japanese Patent Laying-Open No. 9-19987) discloses a layer stack for improving adhesive property of an inner liner layer and a rubber layer. With this technique, adhesive layers are provided on both the sides of the inner liner layer. The adhesive layers come into contact with each other at an overlapping portion of the inner liner layer, and are adhered firmly to each other by heating, which improves air pressure retention property. However, these adhesive layers for overlapping of the inner liner layer will be brought into contact with the bladder in a heated state in a vulcanization step, and will be adhered to the bladder disadvantageously.

In PTD 2 (Japanese Patent No. 2999188), a blend of a nylon resin having favorable air permeability resistance and a butyl rubber is prepared by dynamic cross-linking, and a 100-$\mu$m-thick inner liner layer is produced. However, nylon resin is hard at a room temperature and is unsuitable as an inner liner for tire. Moreover, since this blend prepared by dynamic cross-linking will not be adhered by itself to a rubber layer through vulcanization, an adhesive layer for vulcanization is required in addition to the inner liner layer, resulting in an inner liner component of complicated structure and increase in the number of steps, which is disadvantageous from a viewpoint of productivity.

In PTD 3 (Japanese Patent Laying-Open No. 2008-24219), a maleic anhydride modified hydrogenated styrene-ethylene-butadiene-styrene block copolymer is dispersed in an ethylene-vinyl alcohol copolymer having favorable air permeability resistance to produce a flexible gas barrier layer. Furthermore, a sandwich structure is prepared by a thermoplastic polyurethane layer, and further, a rubber cement is applied to a surface to be adhered to a tire rubber (butyl rubber/natural rubber 70/30 is dissolved in toluene) to produce an inner liner layer.

However, the flexible resin-dispersed modified ethylene-vinyl alcohol copolymer has low adhesive strength, and is likely to be detached from the thermoplastic polyurethane layer. Moreover, although the flexible resin-dispersed modified ethylene-vinyl alcohol copolymer has flexible resin dispersed therein, EVOH of a matrix has poor flex fatigue resistance, and will be damaged during traveling with the tire. Furthermore, although the rubber cement is applied to the surface to be adhered to the tire rubber, an additional step will be necessary besides the usual inner liner step, which will result in poor productivity.

PTD 4 (Japanese Patent Laying-Open No. 2005-343379) achieves improved low temperature durability by designing the thickness at a shoulder portion to be larger than the thickness at a tire crown portion. However, increase in thickness dimension will result in increased weight, which is not preferable from a viewpoint of low fuel consumption and low manufacturing cost.

CITATION LIST

Patent Document

PTD 1: Japanese Patent Laying-Open No. 9-19987
PTD 2: Japanese Patent No. 2999188
PTD 3: Japanese Patent Laying-Open No. 2008-24219
PTD 4: Japanese Patent Laying-Open No. 2005-343379

SUMMARY OF INVENTION

Technical Problem

The present invention has an object to provide a pneumatic tire including an inner liner, which is increased in air permeability resistance by increasing adhesive property of an inner liner with a tire component adjacent thereto, and further, reduced in rolling resistance by weight reduction of the tire and improved in low temperature durability.

Solution to Problem

The present invention is a pneumatic tire including an inner liner disposed on the tire inside relative to a carcass ply bridged between a pair of bead portions. The inner liner is composed of a polymer layer stack including (A) a first layer containing a styrene-isobutylene-styrene triblock copolymer, and (B) a second layer containing at least one of a styrene-isoprene-styrene triblock copolymer and a styrene-isobutylene diblock copolymer. At least one of the first layer and the second layer is a polymer composition containing one of a C4 polymer obtained by polymerizing a monomer unit having 4 carbon atoms, a layered clay mineral with an organic compound intercalated therein and at least one kind of rubber component selected from the group consisting of a natural rubber, an isoprene rubber and a butyl rubber. The second layer is arranged to come into contact with a rubber layer of the carcass ply. The inner liner has a thickness Ge at a shoulder position Pe exceeding 100% and being less than or equal to 500% of a thickness Gc at a crown central position Pc.

Another embodiment of the present invention is a pneumatic tire including an inner liner disposed on the tire inside relative to a carcass ply bridged between a pair of bead portions. The inner liner is composed of a polymer layer stack including (A) a first layer containing a styrene-isobutylene-styrene triblock copolymer and having a thickness of 0.05 mm to 0.6 mm, and (B) a second layer containing at least one of a styrene-isoprene-styrene triblock copolymer and a styrene-isobutylene diblock copolymer and having a thickness of 0.01 mm to 0.3 mm. At least one of the first layer and the second layer has blended therein a C4 polymer obtained by polymerizing a monomer unit having 4 carbon atoms by more than or equal to 0.5 mass % and less than or equal to 40 mass %. The second layer is arranged to come into contact with a rubber layer of the carcass ply. The inner liner has a thickness Ge at a shoulder position Pe being 120% to 500% of a thickness Gc at a crown central position Pc.

Another embodiment of the present invention is a pneumatic tire including an inner liner disposed on the tire inside relative to a carcass ply bridged between a pair of bead portions. The inner liner is composed of a polymer layer stack including (A) a first layer made of a thermoplastic elastomer composition containing a styrene-isobutylene-styrene triblock copolymer by 60 mass % to 99.9 mass % in a polymer component and containing a layered clay mineral with an organic compound intercalated therein by 0.1 part by mass to 50 parts by mass relative to 100 parts by mass of the polymer component, and (B) a second layer of a thermoplastic elastomer composition containing at least one of a styrene-isoprene-styrene triblock copolymer and a styrene-isobutylene diblock copolymer. The second layer is arranged to come into contact with the carcass ply. The inner liner has a thickness Ge at a shoulder position Pe being 120% to 500% of a thickness Gc at a crown central position Pc.

Another embodiment of the present invention is a pneumatic tire including an inner liner disposed on the tire inside relative to a carcass ply bridged between a pair of bead portions. The inner liner is composed of a polymer layer stack including (A) a first layer made of a polymer composition containing a styrene-isobutylene-styrene triblock copolymer by more than or equal to 5 mass % and less than or equal to 40 mass % and at least one kind of rubber component selected from the group consisting of a natural rubber, an isoprene rubber and a butyl rubber by more than or equal to 60 mass % and less than or equal to 95 mass %, and (B) a second layer made of a polymer composition containing at least one of a styrene-isoprene-styrene triblock copolymer and a styrene-isobutylene diblock copolymer by more than or equal to 10 mass % and less than or equal to 85 mass % and containing at least one kind of rubber component selected from the group consisting of a natural rubber, an isoprene rubber and a butyl rubber by more than or equal to 15 mass % and less than or equal to 90 mass %. The second layer is arranged to come into contact with the carcass ply. The inner liner has a thickness Ge at a shoulder position Pe being 120% to 500% of a thickness Gc at a crown central position Pc.

Desirably, in the pneumatic tire of the present invention, in a tire meridian section, when drawing a normal line L from a ground end Te of a tread portion inwardly in a tire radial direction relative to a boundary between the carcass ply and the inner liner and representing an intersection with the boundary by the shoulder position Pe, and representing an intersection of a tire central line CL and the intersection of the carcass ply and the inner liner by crown central position Pc, and representing a distance along a contour line of the inner liner from the shoulder position Pe to the crown central position Pc by a shoulder distance Wc, the inner liner has a thick portion formed in a region having a width of at least 10% of the shoulder distance Wc from the shoulder position Pe toward the crown central position Pc.

When representing a distance along a contour line of the inner liner from the shoulder position Pe to a tire largest width position Ps of the inner liner by a side distance Ws, the inner liner has a thick portion formed in a region having a width of at least 20% of the side distance Ws from the shoulder position Pe toward the largest width position Ps, and desirably formed in a region having a width of less than or equal to 100% of the side distance Ws from the shoulder position Pe toward the largest width position Ps.

The styrene-isobutylene-styrene triblock copolymer contains a styrene component at a content of 10 mass % to 30 mass %, and has a weight average molecular weight of 50,000 to 400,000. Desirably, the styrene-isoprene-styrene triblock copolymer contains a styrene component at a content of 10 mass % to 30 mass %, and has a weight average molecular weight of 100,000 to 290,000.

Furthermore, desirably, a molecular chain of the styrene-isobutylene diblock copolymer is linear, contains a styrene component at a content of 10 mass % to 35 mass %, and has a weight average molecular weight of 40,000 to 120,000.

Advantageous Effects of Invention

A tire of the present invention can have improved air permeability resistance and have a small thickness as a whole since a certain thermoplastic elastomer material is used for an inner liner and a tire shoulder portion is made thick. Further, the inner liner is composed of a layer stack of a first layer and a second layer, and at least one of the first layer and the second layer is a polymer composition containing one of a C4 polymer obtained by polymerizing a monomer unit having 4 carbon atoms, a layered clay mineral with an organic compound intercalated therein and at least one kind of rubber component selected from the group consisting of a natural rubber, an isoprene rubber and a butyl rubber. This can achieve increased adhesive property with an adjacent tire component, improved air permeability resistance and low temperature durability, as well as reduced rolling resistance associated with weight reduction of the tire.

DESCRIPTION OF EMBODIMENTS

<Basic Structure of Pneumatic Tire>

A pneumatic tire of the present invention includes an inner liner disposed on the tire inside relative to a carcass ply bridged between a pair of bead portions, wherein the inner liner is composed of a polymer layer stack including (A) a first layer containing a styrene-isobutylene-styrene triblock copolymer, and (B) a second layer containing at least one of a styrene-isoprene-styrene triblock copolymer and a styrene-isobutylene diblock copolymer. At least one of the first layer and the second layer is a polymer composition containing one of a C4 polymer obtained by polymerizing a monomer unit having 4 carbon atoms, a layered clay mineral with an organic compound intercalated therein and at least one kind of rubber component selected from the group consisting of a natural rubber, an isoprene rubber and a butyl rubber. The second layer is arranged to come into contact with a rubber layer of the carcass ply. The inner liner has a thickness Ge at a shoulder position Pe exceeding 100% and being less than or equal to 500% of a thickness Gc at a crown central position Pc.

Figure 1:
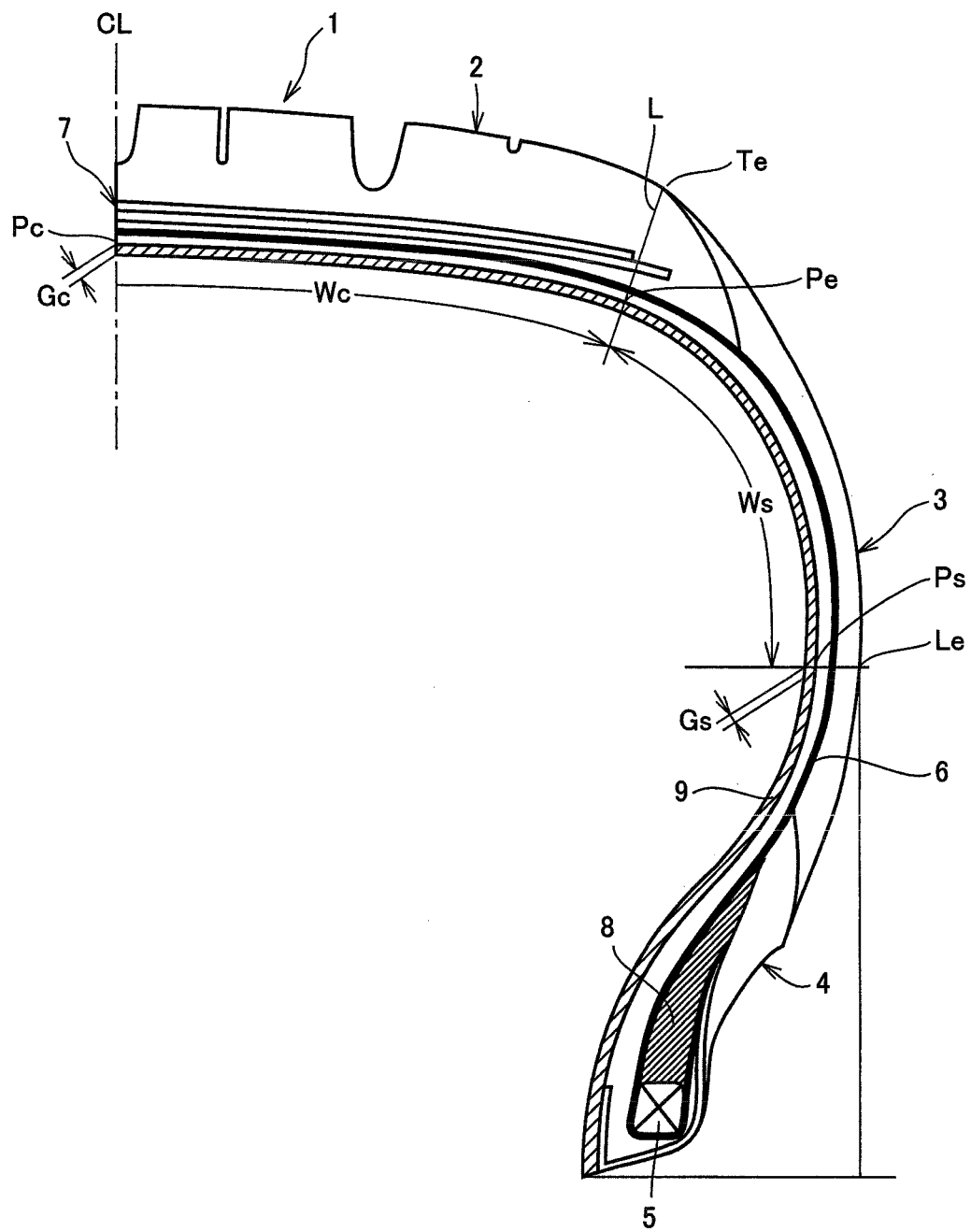
FIG. 1 is a schematic cross sectional view of the right half of a pneumatic tire of the present invention.
Figure 2:
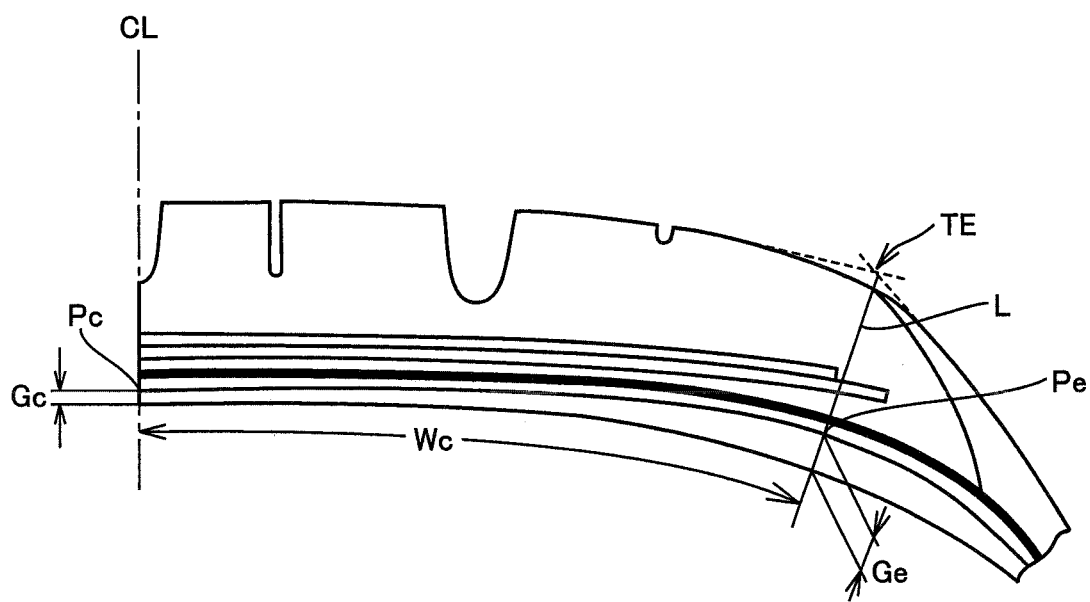
FIG. 2 is an enlarged schematic cross sectional view of a tread portion of FIG. 1.

The basic structure of the pneumatic tire of the present invention will be described based on FIGS. 1 and 2. FIG. 1 is a schematic cross sectional view of the right half of the pneumatic tire, and FIG. 2 is an enlarged schematic cross sectional view of a tread portion thereof. In the figures, a pneumatic tire 1 includes a tread portion 2, and a sidewall portion 3 and bead portions 4 so as to form a shape of toroid from the opposite ends of the tread portion. Further, in each of bead portions 4, a bead core 5 is embedded. Furthermore, a carcass ply 6 and a belt layer 7 are disposed. Carcass ply 6 is provided to extend from one bead portion 4 to the other bead portion, and is anchored by folding its ends around bead cores 5. Belt layer 7, which is formed of at least two plies, is disposed outside a crown portion of carcass ply 6.

Belt layer 7 is generally disposed such that two plies, which are formed of cords such as steel cords or aramid fibers, are arranged to allow the cords to cross each other between the plies normally at an angle of 5° to 30° relative to the tire circumferential direction. It should be noted that topping rubber layers can be provided on the outer sides of the ends of the belt layer to reduce detachment in the ends of the belt layer. Further, in the carcass ply, organic fiber cords such as polyester, nylon, or aramid are arranged at substantially 90° relative to the tire circumferential direction. In a region surrounded by the carcass ply and its folded portion, a bead apex 8 is disposed to extend from the upper end of bead core 5 in the sidewall direction. Further, an inner liner 9 is disposed inwardly relative to carcass ply 6 in the tire radial direction, so as to extend from one bead portion 4 to the other bead portion 4.

In the present specification, the position, distance and width in inner liner 9 are defined as indicated below.

<Shoulder Position Pe>

In a tire meridian section, a normal line L is drawn from a ground end Te of the tread portion inwardly in the tire radial direction with respect to the boundary between carcass ply 6 and inner liner 9, and the intersection with the boundary is defined as a shoulder position Pe. Here, ground end Te of the tread portion is defined as the intersection of a line obtained by extending the outer contour line of the tread portion and a line obtained by extending the outer contour line of the shoulder portion.

<Crown Central Position Pc>

The intersection of a tire central line CL and the boundary between the carcass ply and the inner liner is denoted as a crown central position Pc.

<Largest Width Position Ps>

The intersection of a line parallel to the tire rotation axis passing through a largest width position Le of the outer contour line when the tire is charged with a prescribed internal pressure and a standard rim is mounted, and the boundary between carcass ply 6 and inner liner 9 is denoted as a largest width position Ps.

<Shoulder Distance Wc>

The distance along the contour line of inner liner 9 from shoulder position Pe to crown central position Pc is denoted as a shoulder distance Wc.

<Side Distance Ws>

The distance along the contour line of inner liner 9 from shoulder position Pe to tire largest width position Ps is denoted as a side distance Ws.

<Thickness of Inner Liner>

The thickness of inner liner 9 at crown central position Pc is denoted as Gc, the thickness at shoulder position Pe is denoted as Ge, and the thickness at largest width position Ps is denoted as Gs.

A thick portion of inner liner 9 is desirably formed in a region extending from shoulder position Pe toward crown central position Pc and having a width of at least 10% of shoulder distance Wc. On the other hand, the thick portion is preferably formed in a region having a width of 100% or less of shoulder distance Wc. Furthermore, the thick portion more preferably ranges from 10% to 50% of shoulder distance Wc.

The thick portion of inner liner 9 is preferably formed in a region extending from shoulder position Pe toward largest width position Ps and having a width of at least 20% and 100% or less of side distance Ws. By setting the thick portion to range from 20% to 100% of side distance Ws from shoulder position Pe, deformation of the shoulder portion greatly deformed by flection during traveling with the tire can be restrained, and stress relaxation in this region can be effectively achieved. Furthermore, the thick portion more preferably ranges from 20% to 80% of side distance Ws from shoulder position Pe.

In the present invention, the inner liner has thickness Ge at shoulder position Pe exceeding 100% and being 500% or less of thickness Gc at crown central position Pc. Thickness Ge at shoulder position Pe desirably ranges from 110% to 350% of thickness Gs at largest width position Ps. If thickness Ge at shoulder position Pe is 100% or less, flection deformation and shear deformation of the shoulder portion are not sufficiently restrained. If thickness Ge exceeds 500%, the effect of weight reduction of the inner liner cannot be expected sufficiently.

It is noted that the thick portion is preferably structured to be gradually reduced in thickness toward crown central position Pc and toward largest width position Ps centering on shoulder position Pe. By forming the thick portion of the inner liner as described above, even if flection deformation and shear deformation following repeated deformation in this region during traveling with the tire take place, the stress can be relieved, and cracks can be prevented from occurring in the inner liner.

<Thick Portion>

The thick portion formed at the shoulder portion in the present invention is adjusted such that the thickness of at least one of first and second layers of the inner liner becomes large at the shoulder portion, and in addition, a third layer can also be stacked on the shoulder portion to form the thick portion.

<Thickness of Polymer Layer Stack>

The average thickness of a region of a polymer layer stack excluding the thick portion preferably ranges from 0.06 mm to 1.3 mm. The average thickness of a region of the first layer excluding the thick portion preferably ranges from 0.05 mm to 0.6 mm. If the thickness of the first layer is less than 0.05 mm, the first layer may be broken due to pressing pressure when vulcanizing a raw tire in which the polymer layer stack is applied to the inner liner, with the result that an air leakage phenomenon may take place in the resulting tire. On the other hand, if the thickness of the first layer exceeds 0.6 mm, the weight of the tire is increased to result in decreased performance in fuel efficiency. Further, the first layer preferably has a thickness of 0.05 mm to 0.4 mm. The first layer can be formed by forming a composition containing the SIBS into the form of a film by means of a general method for forming thermoplastic resin or thermoplastic elastomer into a film, such as extrusion molding or calendar molding.

The average thickness of the second layer excluding the thick portion preferably ranges from 0.01 mm to 0.3 mm. Here, when the second layer is made only of an SIS layer, the thickness of the second layer refers to the thickness of this SIS layer. When the second layer is made only of an SIB layer, the thickness of the second layer refers to the thickness of this SIB layer. When the second layer is made of two layers, an SIS layer and an SIB layer, the thickness of the second layer refers to the total thickness of the SIS and SIB layers. If the thickness of the second layer is less than 0.01 mm, the second layer may be broken due to pressing pressure when vulcanizing the raw tire in which the polymer layer stack is applied to the inner liner, with the result that vulcanization adhesive strength may be decreased. On the other hand, if the thickness of the second layer exceeds 0.3 mm, the weight of the tire is increased to result in decreased performance in fuel efficiency. Further, the second layer preferably has a thickness of 0.05 mm to 0.2 mm.

Embodiment A

<Polymer Layer Stack>

In the present invention, the inner liner is formed by a polymer layer stack of at least two layers. The first layer contains the SIBS, and the second layer contains at least one of the SIS and the SIB. The second layer is arranged so as to come into contact with a carcass ply, for example. A C4 polymer obtained by polymerizing a monomer unit having 4 carbon atoms into at least one of the first and second layers is blended by more than or equal to 0.5 mass % and less than or equal to 40 mass %.

<First Layer>

In the present invention, the first layer contains a styrene-isobutylene-styrene triblock copolymer (SIBS). An isobutylene block in the SIBS provides a polymer film made of the SIBS with excellent air permeability resistance. Further, the molecular structure of the SIBS is completely saturated except aromatic side chain, so that the SIBS is restrained from being deteriorated and hardened and therefore a polymer film made of the SIBS has excellent durability. Further, since the polymer film made of the SIBS has excellent air permeability resistance, an amount of usage thereof can be reduced as compared with a halogenated rubber which has been conventionally used and has a high specific gravity. As a result, weight reduction of tire can be achieved, thus obtaining the effect of improving fuel efficiency.

As for the molecular weight of the SIBS, the SIBS preferably has a weight average molecular weight of 50,000 to 400,000 measured through GPC measurement, in view of flowability, shaping step, rubber elasticity, and the like. When the weight average molecular weight thereof is less than 50,000, tensile strength and tensile elongation may be unfavorably decreased. On the other hand, when the weight average molecular weight thereof exceeds 400,000, extrusion workability may become bad. In order to further improve air permeability resistance and durability, the SIBS contains the styrene component at a content of 10 mass % to 30 mass %, preferably, 14 mass % to 23 mass %.

In the copolymer of the SIBS, the isobutylene block preferably has a degree of polymerization in a range of approximately 10,000 to 150,000, and the styrene block preferably has a degree of polymerization in a range of approximately 5,000 to 30,000, in view of rubber elasticity and handling (when the degree of polymerization is less than 10,000, each block will be in a liquid form).

The SIBS can be obtained through a general living cationic polymerization method for a vinyl-based compound. For example, each of Japanese Patent Laying-Open No. 62-48704 and Japanese Patent Laying-Open No. 64-62308 discloses that living cationic polymerization is possible between isobutylene and another vinyl compound and use of isobutylene and another compound for a vinyl compound allows for production of a polyisobutylene-based block copolymer.

(C4 Polymer)

In the present invention, at least one of the first and second layers contains a C4 polymer obtained by polymerizing a monomer unit having 4 carbon atoms. A low molecular weight component of the polymer can improve adhesive strength before vulcanization and adhesive strength through vulcanization between the first layer and another polymer sheet or rubber layer without impairing air permeability resistance originating from the SIBS. Therefore, the use of the first and second layers containing the C4 polymer for the inner liner part of tire improves adhesive strength with an adjacent rubber layer forming a carcass, an insulation or the like and can prevent the air-in phenomenon between the inner liner and the carcass or between the inner liner and the insulation.

The C4 polymer is blended into the first layer or the second layer by more than or equal to 0.5 mass % and less than or equal to 40 mass %. If the C4 polymer is less than 0.5 mass %, vulcanization adhesion of rubber will be degraded. On the other hand, if the C4 polymer exceeds 40 mass %, viscosity will become lower, and extrusion workability becomes bad. Air permeability resistance of the inner liner will further be reduced.

The number average molecular weight of the C4 polymer measured through the GPC method is preferably more than or equal to 300 and less than or equal to 3,000, and more preferably more than or equal to 500 and less than or equal to 2,500. The weight average molecular weight of the C4 polymer measured through the GPC method is preferably more than or equal to 700 and less than or equal to 100,000, and more preferably more than or equal to 1,000 and less than or equal to 80,000. The viscosity average molecular weight of the C4 polymer measured through the FCC method is preferably more than or equal to 20,000 and less than or equal to 70,000, and more preferably more than or equal to 30,000 and less than or equal to 60,000.

Examples of the C4 polymer include polybutene, polyisobutylene and the like. Polybutene is a copolymer having a molecular structure of long chain-like hydrocarbon, obtained by mainly using isobutene as a monomer unit and further using normal butene and causing them to react. As polybutene, hydrogenated polybutene can also be used. Polyisobutylene is a copolymer having a molecular structure of long chain-like hydrocarbon, obtained by using isobutene as a monomer unit and polymerizing this.

<Second Layer>

In the present invention, the second layer contains at least one of an SIS layer made of a styrene-isoprene-styrene triblock copolymer (SIS) and an SIB layer made of a styrene-isobutylene diblock copolymer (SIB).

The SIS contains an isoprene block, which is a soft segment, in molecular chain. Hence, a polymer film made of the SIS is likely to adhere to a rubber component through vulcanization. The molecular weight of the SIS is not particularly limited, but the SIS preferably has a weight average molecular weight of 100,000 to 290,000 measured through GPC measurement, in view of rubber elasticity and moldability. When the weight average molecular weight thereof is less than 100,000, tensile strength may be unfavorably decreased. On the other hand, when the weight average molecular weight thereof exceeds 290,000, extrusion workability unfavorably becomes bad. The SIS preferably contains the styrene component at a content of 10 mass % to 30 mass %, in view of tackiness, adhesive property, and rubber elasticity.

In the present invention, it is preferable that in the SIS, the isoprene block has a degree of polymerization in a range of approximately 500 to 5,000 and the styrene block has a degree of polymerization in a range of approximately 50 to 1,500 in view of rubber elasticity and workability.

The SIS can be obtained through a general polymerization method for a vinyl-based compound, such as the living cationic polymerization method. The SIS layer can be obtained by forming the SIS into the form of a film by means of a general method for forming thermoplastic resin or thermoplastic elastomer into a film, such as extrusion molding or calendar molding.

The SIB contains an isobutylene block which is a soft segment in molecular chain. Hence, a polymer film made of the SIB is likely to adhere to a rubber component through vulcanization. Therefore, a polymer film made of the SIB is excellent in adhesive property with an adjacent rubber forming a carcass or an insulation and in durability.

For the SIB, an SIB having a linear molecular chain is preferably used in view of rubber elasticity and adhesive property. The molecular weight of the SIB is not particularly limited, but the SIS preferably has a weight average molecular weight of 40,000 to 120,000 measured through GPC measurement, in view of rubber elasticity and moldability. When the weight average molecular weight thereof is less than 40,000, tensile strength may be unfavorably decreased. On the other hand, when the weight average molecular weight thereof exceeds 120,000, extrusion workability may become bad.

The SIB preferably contains the styrene component at a content of 10 mass % to 35 mass %, in view of tackiness, adhesive property, and rubber elasticity. In the present invention, it is preferable that in the SIB, the isobutylene block has a degree of polymerization in a range of approximately 300 to 3,000 and the styrene block has a degree of polymerization in a range of approximately 10 to 1,500 in view of rubber elasticity and handling.

The SIB can be obtained through general polymerization for a vinyl-based compound, such as the living cationic polymerization method. International Publication No. WO 2005/033035 discloses a production method in which the SIB can be produced by adding methylcyclohexane, n-butyl chloride, and cumyl chloride into an agitator, cooling them to −70° C., reacting them for 2 hours, then adding a large amount of methanol to stop the reaction, and performing vacuum-drying at 60° C.

The SIB layer can be obtained by forming the SIB into the form of a film by means of a general method for forming thermoplastic resin or thermoplastic elastomer into a film, such as extrusion molding or calendar molding.

The SIS layer or SIB layer constituting the second layer can contain the C4 polymer obtained by polymerizing the monomer unit having 4 carbon atoms. The low molecular weight component of the polymer can improve tackiness before vulcanization and adhesive strength through vulcanization of the SIBS layer as the first layer with another polymer sheet or a rubber layer without impairing air permeability resistance originating from the SIBS. As a result, adhesive strength with an adjacent rubber layer forming a carcass, an insulation or the like can be improved, and the air-in phenomenon between the inner liner and the carcass or between the inner liner and the insulation can be prevented.

The C4 polymer is blended into the SIS layer or SIB layer by more than or equal to 0.5 mass % and less than or equal to 40 mass %. If the C4 polymer is less than 0.5 mass %, vulcanization adhesion of rubber will be degraded. On the other hand, if the C4 polymer exceeds 40 mass %, viscosity will become lower, and extrusion workability becomes bad. Air permeability resistance of the inner liner will further be reduced.

The C4 polymer having the same molecular weight as the C4 polymer blended into the first layer can be used here, however, the type and blending amount thereof can be different between the first and second layers.

Embodiment B

<Polymer Layer Stack>

A polymer layer stack forming an inner liner includes the following first and second layers, and a layered clay mineral with an organic compound intercalated therein is blended into at least the first layer.

The first layer is made of a thermoplastic elastomer composition containing a layered clay mineral with an organic compound intercalated therein by 0.1 part by mass to 50 parts by mass relative to 100 parts by mass of a polymer component containing a styrene-isobutylene-styrene triblock copolymer (SIBS) by 60 mass % to 99.9 mass %. The second layer is made of a thermoplastic elastomer composition containing at least one of a styrene-isoprene-styrene triblock copolymer (SIS) and a styrene-isobutylene diblock copolymer (SIB).

<First Layer>

The first layer is a thermoplastic elastomer composition containing, as a polymer component, the SIBS by 60 mass % to 99.9 mass % in the polymer component, and contains a layered clay mineral with an organic compound intercalated therein by 0.1 part by mass to 50 parts by mass relative to 100 parts by mass of the polymer component.

As the polymer component contained in the first layer, a styrene-based thermoplastic elastomer, a urethane-based thermoplastic elastomer, a rubber component, and a thermoplastic resin can be contained, and these components range from 0.01 mass % to 40 mass % in the polymer component.

(Organic Derivative of Layered Clay Mineral)

In the present invention, a layered clay mineral with an organic compound intercalated therein (hereinafter also referred to as an "organic derivative of layered clay mineral") is blended into the first layer by 0.1 part by mass to 50 parts by mass relative to 100 parts by mass of the polymer component. In the organic derivative of layered clay mineral, the organic compound is intercalated between layers of the layered clay mineral to increase the interlayer distance, which improves dispersibility in the polymer.

The layered clay mineral is a kind of a layer silicate mineral having a crystal structure in which three layers of a silicic acid tetrahedral layer, an alumina octahedral layer and a silicic acid tetrahedral layer are stacked, and presents the form of an ultrathin plate whose unit layer has a thickness of about 10 Å (1 nm) and a breadth of 0.1 μm to 1 μm.

A representative example of the layered clay mineral is montmorillonite. Montmorillonite falls short of positive electric charges with part of Al which is a central atom of the alumina octahedral layer in the crystal structure being substituted by Mg, and each crystal layer itself is negatively charged. However, by inserting a cation, such as Na+, K+, $Ca^{2+}$, or $Mg^{2+}$ between crystal layers, the shortage of charges is neutralized, so that a stable state is attained. Therefore, montmorillonite exists with a number of crystal layers overlapping one upon another.

If water comes into contact with the surface of the plate-like crystal layer of montmorillonite, water molecules will be hydrated into an exchangeable cation between layers, so that the interlayer distance will be increased. Moreover, by intercalating the organic compound between layers by way of the cation exchangeability of montmorillonite, the interlayer distance is increased and dispersibility into an organic solvent or a polymer is improved.

Examples of the layered clay mineral include: phyllosilicates such as a smectite-based clay such as montmorillonite (particularly, sodium montmorillonite, magnesium montmorillonite and calcium montmorillonite), bentoneite, kaolinite, nonlite, beidellite, volkonskoite, hectorite, saponite, sauconite, sobockite, stevensite, svinfordite, and vermiculite; mica minerals such as illite and a mixture of illite/smectite (rectorite, tarosovite, ledikite and a mixture of the clay compound and illite); or attapulgite and sepiolite hydrotalcite-based layered compound, and the like. Among them, a smectite-based clay is preferable, and a montmorillonite-based clay is particularly preferable. Bentoneite containing a smectite-based clay mineral may be used. Generally, these layered clay minerals are obtained by gathering natural minerals and performing a predetermined refining operation thereon. These synthetic clays can be used without distinction.

Examples of the organic compound used as an intercalant include an organic compound having an easy-to-ionize polar group in the molecule. It is held that an organic compound having a polar group brings about a strong interaction with the surface of a layer covered with an anion, such as an oxygen ion of a smectite-based clay mineral, enters (is intercalated) between layers of the layered clay mineral, and increases the interlayer distance to be expanded.

A preferable organic compound has an alkyl group having six or more carbon atoms and has a polar group to be ionized terminally. Examples thereof include an organic compound having a hydroxyl or carboxyl group, aldehydes, amines, amides, and a quaternary ammonium salt.

Examples of the organic compound having a hydroxyl group include phenols as well as alcohols such as fatty alcohol such as octyl alcohol and nonyl alcohol, and aromatic alcohol with an alkyl group substituted.

Examples of the organic compound having a carboxyl group include a straight-chain aliphatic group such as stearic acid, palmitate acid and lauric acid, a straight-chain alkene acid such as oleic acid, dienoic acid such as linolelaidic acid, a polyunsaturated fatty acid such as trienoic acid, and the like.

Examples of aldehydes include hexylaldehyde and the like.

Examples of amines or amides include a polar organic compound having one or more amines or amides, for example, alkylamine, amino cycloalkane and aminocycloalkane substitution, annular aliphatic diamine, aliphatic amine, alkyl aromatic amine, alkyl diarylamine, aliphatic amide, and the like, and primary, secondary and/or tertiary amines or amides are included. Among them, alkylamine, aliphatic amine, alkyl aromatic amine, and alkyl diarylamine are preferable. The above-mentioned organic compounds can be used independently or two or more or them can be used in mixture.

Examples of preferable amines include primary amines such as 1-hexylamine, 1-heptylamine, 1-octylamine, 1-nonylamine, 1-dodecylamine, 1-hexadecylamine, 1-octadecylamine, and oleylamine, secondary amines such as di-n-dodecylamine, di-n-hexadecylamine and di-n-octadecylamine, tertiary amines such as dimethyl-n-octylamine, dimethyl-n-decylamine, dimethyl-n-tetradecylamine, dimethyl-n-hexadecylamine, dimethyl-n-octadecylamine, and dimethyloleylamine, and aliphatic amines such as di-n-decylmethylamine, dicocoalkyl methylamine, tri-n-octylamine, tri-n-decylamine, and tri-n-hexadecyl amine.

Examples of preferable amides include hexylamide, heptylamide, octylamide, nonylamide, lauramide, myristamide, palmitamide, steramide, palmiamide, oleamide, linoleamide, and the like.

Moreover, as an organic compound having a polar group, an organic compound having a nitrile group or a lactam group, pyridines, esters, surface active agents, ethers or the like can also be used.

Examples of the quaternary ammonium salt include dimethyldistearyl ammonium salt, trimethylstearyl ammonium salt, dimethyldioctadecyl ammonium, dimethylbenzyl octadecyl ammonium, trimethyl octadecyl ammonium, and the like.

As a method for intercalating an organic compound into a layered clay mineral, a publicly-known method can be adopted. For example, in order to bring a montmorillonite-based clay mineral and an organic compound into contact with each other, there is a method for previously causing a layered clay mineral to contain water of about 20 times the mass thereof and then bringing an organic compound and the montmorillonite-based clay mineral into contact to obtain an organic derivative of clay mineral. The cation exchange amount of the organic compound in the organic derivative of layered clay mineral is preferably 50 to 200 meg/100 g.

The blending amount of the organic derivative of layered clay mineral is 0.1 part by mass to 50 parts by mass relative to 100 parts by mass of the polymer component, and more preferably 0.5 part by mass to 30 parts by mass. If the blending amount of the organic derivative of layered clay mineral is less than 0.1 part by mass, air permeability resistance and tensile property at the time of high temperature of the first layer will be decreased. On the other hand, if the blending amount of the organic derivative of layered clay mineral exceeds 50 parts by mass, the first layer will have excessively large hardness, and flex fatigue resistance will be decreased.

<Second Layer>

In the present invention, the second layer has at least one of an SIS layer containing the SIS and an SIB layers containing the SIB. Here, materials similar to those described in Embodiment A can be used as the SIS and SIB.

<Thick Portion>

In the inner liner of the present invention, desirably, the thickness of the thick portion, i.e., thickness Ge at shoulder position Pe, is 160% to 300% of thickness Gc at crown central position Pc, and thickness Ge at shoulder position Pe is 110% to 350% of thickness Gs at largest width position Ps. When thickness Ge at shoulder position Pe is less than 160%, flection deformation and shear deformation of the shoulder portion will not be sufficiently restrained. When it exceeds 300%, the effect of weight reduction of the inner liner could not be expected sufficiently. Thickness Ge at shoulder position Pe is more preferably 200% to 300% of thickness Gc at crown central position Pc.

It is noted that the thick portion is preferably structured so as to be gradually reduced in thickness toward crown central position Pc and toward largest width position Ps centering on shoulder position Pe. By forming the thick portion of the inner liner as described above, even if flection deformation and shear deformation following repeated deformation in this region during traveling with the tire take place, the stress can be relieved, and cracks can be prevented from occurring in the inner liner.

<Thickness of Polymer Layer Stack>

The average thickness of a region of the polymer layer stack excluding the thick portion is desirably adjusted to range from 0.06 mm to 1.3 mm.

The average thickness of a region of the first layer excluding the thick portion is desirably 0.05 mm to 1.0 mm, and preferably 0.1 mm to 0.7 mm. If the thickness of the first layer is less than 0.05 mm, the first layer may be broken due to pressing pressure when vulcanizing the raw tire in which the polymer layer stack is applied to the inner liner, with the result that an air leakage phenomenon may take place in the resulting tire. On the other hand, if the thickness of the first layer exceeds 1.0 mm, the weight of the tire is increased to result in decreased performance in fuel efficiency.

Embodiment C

<Polymer Layer Stack>

The inner liner is composed of a polymer layer stack including the first and second layers, and one of the layers is a polymer composition containing at least one kind of rubber component selected from the group consisting of a natural rubber, an isoprene rubber and a butyl rubber.

<First Layer>

(Polymer Composition)

The first layer is made of a polymer composition containing sulfur by more than or equal to 0.1 part by mass and less than or equal to 5 parts by mass relative to 100 parts by mass of a polymer component containing the SIBS by more than or equal to 5 mass % and less than or equal to 40 mass % and at least one kind of rubber component selected from the group consisting of a natural rubber, an isoprene rubber and a butyl rubber by more than or equal to 60 mass % and less than or equal to 95 mass %.

The polymer composition contains the SIBS, the rubber component and sulfur. When the rubber component and sulfur are added to the SIBS and mixed by heating, the rubber component and sulfur produce a vulcanization reaction during mixing by heating to form a sea-island structure in which the SIBS serves as a matrix (sea), and the rubber component serves as an island.

The polymer composition having the sea-island structure has air permeability resistance originating in the matrix phase composed of the SIBS. Further, the rubber component constituting the island phase has tackiness before vulcanization with an adjacent member containing a rubber component and adhesive property with the adjacent member through vulcanization because of the vulcanization reaction produced with the rubber component of the adjacent member during mixing by heating. Therefore, the polymer sheet composed of the polymer composition can have excellent air permeability resistance, and have tackiness before vulcanization and adhesive property with the adjacent member through vulcanization.

The SIBS content is more than or equal to 5% by mass and less than or equal to 40% by mass of the polymer component in the polymer composition. When the SIBS content is less than 5% by mass, air permeability resistance of the polymer sheet may be reduced. On the other hand, when the SIBS content is more than 40% by mass, vulcanization adhesive strength with an adjacent member may be insufficient. The SIBS content is preferably more than or equal to 10% by mass and less than or equal to 30% by mass of the polymer component from the viewpoint of ensuring air permeability resistance.

(Rubber Component)

The polymer composition constituting the polymer layer stack contains a rubber component. The rubber component can provide the polymer composition with tackiness before vulcanization with an adjacent member containing a rubber component. Further, because of the vulcanization reaction with sulfur, the polymer composition can be provided with adhesive property with an adjacent member, such as a carcass or an insulation, through vulcanization.

The rubber component contains at least one kind selected from the group consisting of a natural rubber, an isoprene rubber and a butyl rubber, and it is particularly preferable to contain natural rubber from the viewpoint of breaking strength and adhesive property.

The content of the rubber component is more than or equal to 60% by mass and less than or equal to 95% by mass of the polymer component in the polymer composition. When the content of the rubber component is less than 60% by mass, the viscosity of the polymer composition increases to cause extrusion moldability to deteriorate, so that when producing a polymer layer stack, the sheet cannot be made thin. On the other hand, when the content of the rubber component is more than 95% by mass, air permeability resistance of the sheet may be reduced. The content of the rubber component is preferably more than or equal to 70% by mass and less than or equal to 90% by mass of the polymer component from the viewpoint of tackiness before vulcanization and adhesive property through vulcanization.

(Sulfur)

The polymer composition contains sulfur. As sulfur, sulfur generally used in the rubber industry for vulcanization can be used. It is particularly preferable to use insoluble sulfur. As used herein, insoluble sulfur refers to sulfur obtained by heating and rapidly cooling natural sulfur S8, and polymerizing it so as to become Sx (x=100,000 to 300,000). The use of insoluble sulfur can prevent blooming that would usually occur when sulfur is used as a rubber vulcanization agent.

The sulfur content is more than or equal to 0.1 part by mass and less than or equal to 5 parts by mass with respect to 100 parts by mass of the polymer component. When the sulfur content is less than 0.1 part by mass, the vulcanization effect of the rubber component cannot be achieved. On the other hand, when the sulfur content is more than 5 parts by mass, the hardness of the polymer composition increases, and when the polymer layer stack is used as an inner liner, the durability of a pneumatic tire may deteriorate. The sulfur content is preferably more than or equal to 0.3 part by mass and less than or equal to 3.0 parts by mass.

(Compounding Agent in Polymer Composition)

The polymer composition can contain compounding agents such as stearic acid, zinc oxide, an antioxidant, a vulcanization accelerator, and the like.

Stearic acid functions as a vulcanization assistant for the rubber component. The content of stearic acid is preferably more than or equal to 1 part by mass and less than or equal to 5 parts by mass with respect to 100 parts by mass of the polymer component. When the content of stearic acid is less than 1 part by mass, the effect as a vulcanization assistant cannot be achieved. On the other hand, when the content of stearic acid is more than 5 parts by mass, the viscosity of the polymer composition may be reduced, and the breaking strength may be reduced, which is not preferable. The content of stearic acid is more preferably more than or equal to 1 part by mass and less than or equal to 4 parts by mass.

Zinc oxide functions as a vulcanization assistant of the rubber component. The content of zinc oxide is preferably more than or equal to 0.1 part by mass and less than or equal to 8 parts by mass with respect to 100 parts by mass of the polymer component. When the content of zinc oxide is less than 0.1 part by mass, the effect as a vulcanization assistant cannot be achieved. On the other hand, when the content of zinc oxide is more than 8 parts by mass, the hardness of the polymer composition increases, and when the polymer sheet is used as the inner liner, the durability of a pneumatic tire may deteriorate. The content of zinc oxide is more preferably more than or equal to 0.5 part by mass and less than or equal to 6 parts by mass.

An antioxidant has the function of preventing a series of degradations called aging, such as oxidation degradation, thermal degradation, ozone degradation, and fatigue degradation. Antioxidants are classified into a primary antioxidant including amines or phenols and a secondary antioxidant including sulfur compounds or phosphites. The primary antioxidant has the function of supplying hydrogen to various polymer radicals to stop a chain reaction of autooxidation, and the secondary antioxidant exhibits a stabilizing effect by turning hydroxyperoxide into stable alcohol.

Examples of the antioxidant include amines, phenols, imidazoles, phosphors, thioureas, and the like. One kind of antioxidant may be used solely, or two or more kinds may be used in combination. Particularly, it is preferable to use N-(1,3-dimethylbutyl)-N'-phenyl-p-phenylenediamine.

The antioxidant content is preferably more than or equal to 0.1 part by mass and less than or equal to 5 parts by mass with respect to 100 parts by mass of the polymer component. When the antioxidant content is less than 0.1 part by mass, the antioxidant effect cannot be achieved. On the other hand, when the antioxidant content is more than 5 parts by mass, the blooming phenomenon will occur in the polymer composition. The antioxidant content is more preferably more than or equal to 0.3 part by mass and less than or equal to 4 parts by mass.

As the vulcanization accelerator, thiurams, thiazoles, thioureas, dithiocarbamates, guanidines, sulfenamides, and the like can be used. One kind of vulcanization accelerator may be used solely, or two or more kinds may be used in combination. Particularly, it is preferable to use dibenzothiazyl sulfide.

The content of the vulcanization accelerator is preferably more than or equal to 0.1 part by mass and less than or equal to 5 parts by mass with respect to 100 parts by mass of the polymer component. When the content of the vulcanization accelerator is less than 0.1 part by mass, the vulcanization acceleration effect cannot be achieved. On the other hand, when the content of the vulcanization accelerator is more than 5 parts by mass, the hardness of the polymer composition increases, and when the polymer sheet is used as an inner liner, the durability of a pneumatic tire may deteriorate. In addition, the raw material cost increases. The content of the vulcanization accelerator is more preferably more than or equal to 0.3 part by mass and less than or equal to 4 parts by mass.

<Second Layer>

In the present invention, the second layer is made of a polymer composition containing at least one of an SIS and an SIB by more than or equal to 10 mass % and less than or equal to 85 mass % and further containing at least one kind of rubber component selected from the group consisting of a natural rubber, an isoprene rubber and a butyl rubber by more than or equal to 15 mass % and less than or equal to 90 mass %.

The second layer has at least one of an SIS layer containing the SIS and an SIB layer containing the SIB. The polymer composition of the second layer contains at least one kind of rubber component selected from the group consisting of a natural rubber, an isoprene rubber and a butyl rubber by more than or equal to 15 mass % and less than or equal to 90 mass % of the polymer component. By blending the rubber component within this range, the polymer composition can be provided with tackiness before vulcanization with an adjacent member containing a rubber component. Further, through dynamic vulcanization, the polymer composition can be provided with adhesive property with adjacent members, such as the first layer, a carcass and an insulation, through vulcanization.

When the content of the rubber component is less than 15 mass % in the polymer component of the polymer composition, the viscosity of the polymer composition increases to cause extrusion moldability to deteriorate. Thus, when producing a polymer layer stack, the sheet cannot be made thin. On the other hand, when the content of the rubber component is more than 90% by mass, air permeation resistance of the sheet may be reduced.

<Method for Producing Polymer Layer Stack>

In the present invention, the first layer of the polymer layer stack used for the inner liner can be produced by the following method, for example. The respective ingredients are charged into a twin-screw extruder and kneaded under the conditions of about 150° C. to 280° C. and 50 rpm to 300 rpm, thereby obtaining a pellet of a polymer composition in which the SIBS, the rubber component, sulfur, and the like are dynamically crosslinked. The obtained pellet is charged into a T-die extruder to obtain the first layer of desired thickness. The first layer can be shaped into a sheet, and can be bonded to the second layer to form a polymer layer stack. The polymer layer stack can be produced by lamination extrusion, such as laminate extrusion or coextrusion.

In the twin-screw extruder, the SIBS, which is a thermoplastic elastomer, serves as the matrix phase, and the rubber component serves as the island phase and is dispersed. Further, in the twin-screw extruder, the rubber component reacts with the additive component, and the rubber component serving as the island phase produces a crosslinking reaction. Since the rubber component is dynamically crosslinked in the twin-screw extruder, it is called dynamic crosslinking. Even if the rubber component is crosslinked in the twin-screw extruder, the shear viscosity of the whole system is low since the matrix phase of the system is composed of the thermoplastic elastomer component, so that extrusion molding is possible.

In the pellet of the dynamically-crosslinked polymer composition obtained with the twin-screw extruder, the rubber component is crosslinked, however, the thermoplastic elastomer component of the matrix phase holds plasticity, and serves to produce plasticity of the whole polymer composition. Therefore, the polymer composition also exhibits plasticity in the T-die extrusion, and thus can be molded into a sheet shape.

Further, since the rubber component is crosslinked in the pellet of the dynamically-crosslinked polymer composition, the inner liner can be prevented from penetrating into the carcass layer even when a pneumatic tire is heated while manufacturing the pneumatic tire by using the polymer sheet produced from this pellet as the inner liner.

It is noted that although a method similar to the method for producing the first layer can be adopted for the second layer, a conventional method for mixing sulfur and additives into the SIB or the SIS and the rubber component by a Banbury mixer, and then forming a thermoplastic resin or a thermoplastic elastomer into a sheet, such as extrusion molding or calendar molding, can be adopted.

<Thickness of Polymer Layer Stack>

The average thickness of a region of the polymer layer stack excluding the thick portion ranges from 0.06 mm to 1.3 mm. When the thickness of the polymer layer stack is less than 0.06 mm, the polymer layer stack may be broken by pressing pressure when vulcanizing a raw tire in which the polymer layer stack is applied to the inner liner, and thus an air leak phenomenon may occur in the vulcanized tire. On the other hand, when the thickness of the polymer layer stack exceeds 1.3 mm, the weight of the tire is increased to result in decreased performance in fuel efficiency. The thickness of the polymer layer stack is preferably more than or equal to 0.25 mm and less than or equal to 0.8 mm.

It is noted that the thick portion formed in the shoulder portion in the present invention is adjusted such that at least one of the first and second layers of the inner liner is increased in thickness at the shoulder portion, and besides, a third layer can also be stacked on the shoulder portion to form the thick portion.

The average thickness of the second layer excluding the thick portion is desirably 0.01 mm to 0.3 mm. When the thickness of the second layer is less than 0.01 mm, the second layer may be broken due to pressing pressure when vulcanizing the raw tire in which the polymer layer stack is applied to the inner liner, and vulcanization adhesive strength may be decreased. On the other hand, when the thickness of the second layer exceeds 0.3 mm, the weight of the tire is increased to result in decreased performance in fuel efficiency. The second layer more preferably has a thickness of 0.05 mm to 0.2 mm.

<Structure of Polymer Layer Stack>

For the structure of the polymer layer stack used for the inner liner of each embodiment according to the present invention, various forms can be adopted. These forms will be described based on FIGS. 3 to 6 showing schematic cross sectional views of an inner liner.

Figure 3:
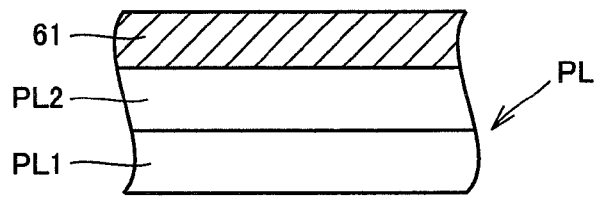
FIG. 3 is a schematic cross sectional view of an inner liner of a pneumatic tire of the present invention.

A polymer layer stack PL includes an SIBS layer PL1 as the first layer and an SIS layer PL2 as the second layer, as shown in FIG. 3. When applying polymer layer stack PL to the inner liner of the pneumatic tire and disposing SIS layer PL2 outwardly in the tire radial direction such that SIS layer PL2 will be brought into contact with carcass ply 61, adhesive strength between SIS layer PL2 and carcass 61 can be increased in the step of vulcanizing the tire.

Figure 4:
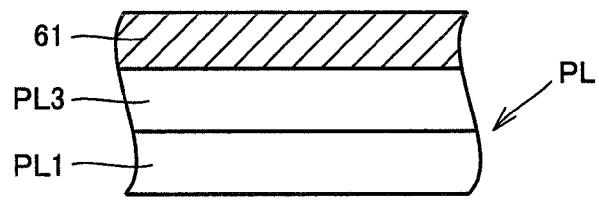
FIG. 4 is a schematic cross sectional view of an inner liner of a pneumatic tire of the present invention.

Alternatively, polymer layer stack PL includes SIBS layer PL1 as the first layer and an SIB layer PL3 as the second layer, as shown in FIG. 4. When applying polymer layer stack PL to the inner liner of the pneumatic tire and disposing a surface of SIB layer PL3 outwardly in the tire radial direction so as to be brought into contact with carcass ply 61, adhesive strength between SIB layer PL3 and carcass 61 can be increased in the step of vulcanizing the tire.

Figure 5:
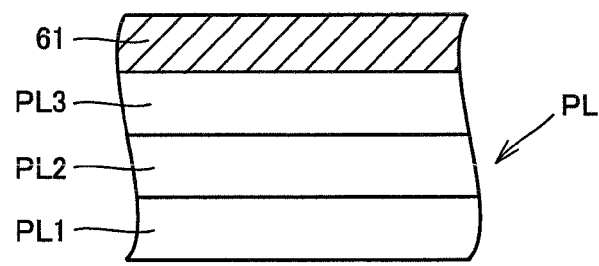
FIG. 5 is a schematic cross sectional view of an inner liner of a pneumatic tire of the present invention.
Figure 6:
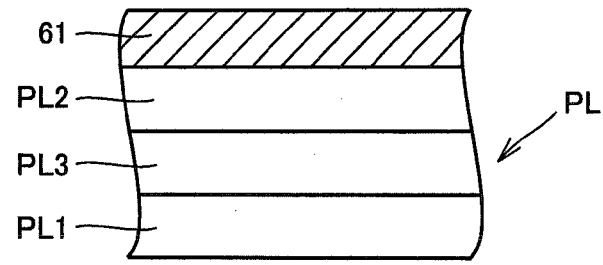
FIG. 6 is a schematic cross sectional view of an inner liner of a pneumatic tire of the present invention.

Alternatively, polymer layer stack PL includes SIBS layer PL1 as the first layer, SIS layer PL2 and SIB layer PL3 as the second layer stacked in the presented order, as shown in FIG. 5. When applying polymer layer stack PL to the inner liner of the pneumatic tire and disposing a surface of SIB layer PL3 outwardly in the tire radial direction so as to be brought into contact with carcass ply 61, adhesive strength between SIB layer PL3 and carcass ply 61 can be increased in the step of vulcanizing the tire. Alternatively, polymer layer stack PL can include SIBS layer PL1 as the first layer and SIB layer PL3 and SIS layer PL2 as the second layer stacked in the presented order, as shown in FIG. 6.

<Method for Manufacturing Pneumatic Tire>

The pneumatic tire of the present invention can be manufactured using a general manufacturing method. Pneumatic tire 1 can be manufactured by applying the above-described polymer layer stack PL to the inner liner of a raw tire and molding them through vulcanization together with other members. When disposing polymer layer stack PL in the raw tire, polymer layer stack PL is arranged outwardly in the tire radial direction such that the second layer will be brought into contact with carcass ply 61. With such arrangement, vulcanization adhesive strength between the second layer and carcass 6 can be increased in the tire vulcanizing step. In the resulting pneumatic tire, the inner liner and the rubber layer of carcass ply 61 are adhered to each other in an excellent manner. Thus, the pneumatic tire can have excellent air permeability resistance and durability.

It is noted that, in order to adjust the thickness of the inner liner by thickness Ge at shoulder position Pe, thickness Gc at crown central position Pc and thickness Gs at largest width position Ps, for example, a profile is provided for an extrusion port of the polymer sheet, and an integral sheet in which thickness Ge in the vicinity of the shoulder position is a predetermined thickness is produced, and is disposed on the tire inside as an inner liner.

As a formulation of the rubber layer of the carcass ply used for the pneumatic tire of the present invention, a blend of a filler such as carbon black or silica into a commonly used rubber component, such as, for example, a natural rubber, polyisoprene, a styrene-butadiene rubber, a polybutadiene rubber, or the like can be used.

EXAMPLES

Example A

Pneumatic tires of Examples and Comparative Examples were manufactured according to the specifications shown in Tables 1A to 3A, and performance thereof was evaluated. Here, the SIB, SIBS and SIS used for the first and second layers were prepared as follows.

<SIB>

Into a 2 L reaction container having an agitator, 589 mL of methylcyclohexane (dried with molecular sieves), 613 ml of n-butyl chloride (dried with molecular sieves), and 0.550 g of cumyl chloride were added. The reaction container was cooled to −70° C., and then 0.35 mL of α-picoline (2-methylpyridine) and 179 mL of isobutylene were added. Further, 9.4 mL of titanium tetrachloride was added to start polymerization. They were reacted with each other for 2.0 hours while stirring the solution at −70° C. Next, 59 mL of styrene was added to the reaction container, and reaction was continued for another 60 minutes. Thereafter, a large amount of methanol was added to stop the reaction. After removing a solvent and the like from the reaction solution, the polymer was dissolved with toluene and rinsed twice. This toluene solution was added to a methanol mixture to precipitate a polymer. The polymer thus obtained was dried at 60° C. for 24 hours, thereby obtaining a styrene-isobutylene diblock copolymer.

Content of the styrene component: 15 mass
Weight average molecular weight: 70,000
<SIBS>
"SIBSTAR 102 (Shore A hardness: 25; the content of the styrene component: 25 mass %; weight average molecular weight: 100,000)" provided by Kaneka Corporation was used.
<SIS>
D1161JP (the content of the styrene component: 15 mass %; weight average molecular weight: 150,000) provided by Kraton Polymers was used.
<C4 Polymer>
Polybutene: "Nisseki Polybutene Grade HV300" (number average molecular weight: 300) provided by Nippon Oil Corporation was used.

<Manufacturing of Pneumatic Tire>
The above-described SIBS, SIS and SIB were pelletized using a biaxial extruder (screw diameter: φ50 mm; L/D: 30; cylinder temperature: 220° C.). Thereafter, the inner liner was fabricated using a T-die extruder (screw diameter: φ80 mm; L/D: 50; die gap width: 500 mm; cylinder temperature: 220° C.; film gauge: 0.3 mm).

The pneumatic tire was manufactured as follows. That is, a raw tire was manufactured by using the above-described polymer layer stack for the inner liner in a product having the basic structure shown in FIG. 1 with a size of 195/65R15. Then, in the vulcanization step, press molding was performed at 170° C. for 20 minutes.

Here, in order to adjust the thickness of the shoulder portion of the inner liner, a profile was provided for the extrusion port of the polymer sheet, and an integral sheet with thickness Ge at the shoulder position increased was produced and disposed on the tire inside as an inner liner.

TABLE 1A

| | | | Film I/L Material | | | | Add and Blend Polybutene into SIBS | | | |
|---|---|---|---|---|---|---|---|---|---|---|
| | | | Comparative Example 1A | Comparative Example 2A | Comparative Example 3A | Comparative Example 4A | Example 1A | Example 2A | Example 3A | Comparative Example 5A |
| Inner Liner Structure | First Layer | SIBS (parts by mass) | 100 | 100 | 100 | 99.8 | 99.5 | 90 | 60 | 50 |
| | | Polybutene (parts by mass) | | | | 0.2 | 0.5 | 10 | 40 | 50 |
| | Second Layer | SIS (parts by mass) | | 100 | | 100 | 100 | 100 | 100 | 100 |
| | | SIB (parts by mass) | | | 100 | | | | | |
| | | Polybutene (parts by mass) | | | | | | | | |
| | First Layer | Thickness of SIBS layer (mm) | 0.8 | 0.8 | 0.8 | 0.8 | 0.8 | 0.8 | 0.8 | 0.8 |
| | Second Layer | Thickness of SIS Layer (mm) | | 0.8 | 0.8 | 0.8 | 0.8 | 0.8 | 0.8 | 0.8 |
| | | Thickness of SIB Layer (mm) | | | | | | | | |
| | Thickness of Thick Portion (mm) | | 1.9 | 1.9 | 1.9 | 1.9 | 1.9 | 1.9 | 1.9 | 1.9 |
| | Thickness Deviation Range wc/ws (%) | | 10/20 | 10/20 | 10/20 | 10/20 | 10/20 | 10/20 | 10/20 | 10/20 |
| | Thickness Ratio (Ge/Gc) (%) | | 237 | 119 | 119 | 119 | 119 | 119 | 119 | 119 |
| Performance Evaluation | Adhesive Strength of Layer Stack (index) | | 100 | 152 | 150 | 190 | 205 | 210 | 240 | 250 |
| | Rolling Resistance (index) | | 100 | 100 | 100 | 96 | 106 | 108 | 108 | 98 |
| | Low Temperature Durability (index) | | 100 | 110 | 105 | 114 | 118 | 118 | 118 | 105 |
| | Static Air Decreasing Ratio (%/month) | | 1.7 | 1.9 | 1.9 | 2 | 1.7 | 1.5 | 1.3 | 4.3 |
| | Presence/Absence of Air-in | | present | absent | present | present | absent | absent | absent | present |

TABLE 2A

| | | | Add and Blend Polybutene into SIS | | | | | Add and Blend Polybutene into SIB | | | |
|---|---|---|---|---|---|---|---|---|---|---|---|
| | | | Comparative Example 6A | Example 4A | Example 5A | Example 6A | Comparative Example 7A | Comparative Example 8A | Example 7A | Example 8A | Example 9A | Comparative Example 9A |
| Inner Liner Structure | First Layer | SIBS (parts by mass) | 100 | 100 | 100 | 100 | 100 | 100 | 100 | 100 | 100 | 100 |
| | | Polybutene (parts by mass) | | | | | | | | | | |

TABLE 2A-continued

|  |  |  | Add and Blend Polybutene into SIS | | | | | Add and Blend Polybutene into SIB | | | | |
|---|---|---|---|---|---|---|---|---|---|---|---|---|
|  |  |  | Comparative Example 6A | Example 4A | Example 5A | Example 6A | Comparative Example 7A | Comparative Example 8A | Example 7A | Example 8A | Example 9A | Comparative Example 9A |
|  | Second Layer | SIS (parts by mass) | 99.8 | 99.5 | 90 | 60 | 50 |  |  |  |  |  |
|  |  | SIB (parts by mass) |  |  |  |  |  | 99.8 | 99.5 | 90 | 60 | 50 |
|  |  | Polybutene (parts by mass) | 0.2 | 0.5 | 10 | 40 | 50 | 0.2 | 0.5 | 10 | 40 | 50 |
|  | First Layer | Thickness of SIBS Layer (mm) | 0.8 | 0.8 | 0.8 | 0.8 | 0.8 | 0.8 | 0.8 | 0.8 | 0.8 | 0.8 |
|  | Second Layer | Thickness of SIS Layer (mm) | 0.8 | 0.8 | 0.8 | 0.8 | 0.8 |  |  |  |  |  |
|  |  | Thickness of SIB Layer (mm) |  |  |  |  |  | 0.8 | 0.8 | 0.8 | 0.8 | 0.8 |
|  |  | Thickness of Thick Portion (mm) | 1.9 | 1.9 | 1.9 | 1.9 | 1.9 | 1.9 | 1.9 | 1.9 | 1.9 | 1.9 |
|  |  | Thickness Deviation Range wc/ws (%) | 10/20 | 10/20 | 10/20 | 10/20 | 10/20 | 10/20 | 10/20 | 10/20 | 10/20 | 10/20 |
|  |  | Thickness Ratio (Ge/Gc) (%) | 119 | 119 | 119 | 119 | 119 | 119 | 119 | 119 | 119 | 119 |
| Performance Evaluation | | Adhesive Strength of Layer Stack (index) | 188 | 203 | 207 | 238 | 248 | 186 | 201 | 205 | 236 | 246 |
|  |  | Rolling Resistance (index) | 94 | 107 | 110 | 110 | 96 | 92 | 105 | 108 | 108 | 94 |
|  |  | Low Temperature Durability (index) | 112 | 117 | 117 | 117 | 103 | 110 | 116 | 116 | 116 | 101 |
|  |  | Static Air Decreasing Ratio (%/month) | 2 | 1.9 | 1.7 | 1.5 | 4.5 | 2 | 2 | 1.8 | 1.6 | 4.7 |
|  |  | Presence/Absence of Air-in | present | absent | absent | absent | present | present | absent | absent | absent | present |

TABLE 3A

|  |  |  | SIBS + SIS with thickness of thick portion varied | | | | SIBS + SIB with thickness of thick portion varied | | | |
|---|---|---|---|---|---|---|---|---|---|---|
|  |  |  | Comparative Example 10A | Example 10A | Example 11A | Comparative Example 11A | Comparative Example 12A | Example 12A | Example 13A | Comparative Example 13A |
| Inner Liner Structure | First Layer | SIBS (parts by mass) | 90 | 90 | 90 | 90 | 90 | 90 | 90 | 90 |
|  |  | Polybutene (parts by mass) | 10 | 10 | 10 | 10 | 10 | 10 | 10 | 10 |
|  | Second Layer | SIS (parts by mass) | 100 | 100 | 100 | 100 |  |  |  |  |
|  |  | SIB (parts by mass) |  |  |  |  | 100 | 100 | 100 | 100 |
|  |  | Polybutene (parts by mass) |  |  |  |  |  |  |  |  |
|  | First Layer | Thickness of SIBS Layer (mm) | 0.8 | 0.25 | 0.25 | 0.25 | 0.8 | 0.25 | 0.25 | 0.25 |
|  | Second Layer | Thickness of SIS Layer (mm) | 0.8 | 0.05 | 0.05 | 0.05 |  |  |  |  |
|  |  | Thickness of SIB Layer (mm) |  |  |  |  | 0.8 | 0.05 | 0.05 | 0.05 |
|  |  | Thickness of Thick Portion (mm) | 0.2 | 1 | 0.5 | 0.2 | 0.2 | 1 | 0.5 | 0.2 |
|  |  | Thickness Deviation Range wc/ws (%) | 10/20 | 10/20 | 10/20 | 10/20 | 10/20 | 10/20 | 10/20 | 10/20 |
|  |  | Thickness Ratio (Ge/Gc) (%) | 12.5 | 333 | 167 | 67 | 12.5 | 333 | 167 | 67 |
| Performance | | Adhesive Strength of Layer Stack (index) | 207 | 207 | 207 | 207 | 205 | 205 | 205 | 205 |

TABLE 3A-continued

|  |  | SIBS + SIS with thickness of thick portion varied | | | | SIBS + SIB with thickness of thick portion varied | | | |
| --- | --- | --- | --- | --- | --- | --- | --- | --- | --- |
|  |  | Comparative Example 10A | Example 10A | Example 11A | Comparative Example 11A | Comparative Example 12A | Example 12A | Example 13A | Comparative Example 13A |
| Evaluation | Rolling Resistance (index) | 99 | 102 | 105 | 104 | 98 | 100 | 103 | 102 |
|  | Low Temperature Durability (index) | 93 | 118 | 116 | 112 | 91 | 116 | 114 | 110 |
|  | Static Air Decreasing Ratio (%/month) | 2.1 | 1.8 | 1.9 | 2 | 2.2 | 1.9 | 2 | 2.1 |
|  | Presence/Absence of Air-in | absent | absent | absent | absent | absent | absent | absent | absent |

(*1) In Tables 1A to 3A, "Thickness Deviation Range (wc/ws) (%)" represents a rate wc (%) of a distance extending toward crown central position Pc with respect to shoulder position Pe to Wc and a rate ws (%) of a distance extending toward largest width position Ps with respect to shoulder position Pe to Ws.
(*2) In Tables 1A to 3A, Thickness Ratio (Ge/Gs) of the thick portion has the same value as (Ge/Ge).

Comparative Examples 1A to 3A

In Comparative Example 1A, the SIBS layer includes only one layer. In Comparative Example 2A, the first layer is an SIBS layer and the second layer is an SIS layer. In Comparative Example 3A, the first layer is an SIBS layer and the second layer is an SIB layer. In each of Comparative Examples 1A to 3A, polybutene is not added although the thick portion is formed at shoulder position Pe.

Comparative Examples 4A, 5A and Examples 1A to 3A

In Table 1A, in Examples 1A to 3A, the SIBS was used for the first layer and the SIS was used for the second layer, and polybutene was added to the first layer. In Comparative Example 4, a small amount of polybutene was added. In Comparative Example 5A, a large amount of polybutene was blended. The value of Ge/Gc was 119% in each case.

Comparative Examples 6A, 7A and Examples 4A to 6A

In Table 2A, in Examples 4A to 6A, the SIBS was used for the first layer, the SIS was used for the second layer, and polybutene was added to the second layer. In Comparative Example 6A, a small amount of polybutene was added. In Comparative Example 7A, a large amount of polybutene was blended. The value of Ge/Gc was 119% in each case.

Comparative Examples 8A, 9A and Examples 7A to 9A

In Table 2A, in Examples 7A to 9A, the SIBS was used for the first layer, the SIB was used for the second layer, and polybutene was added to the second layer. In Comparative Example 8A, a small amount of polybutene was added. In Comparative Example 9A, a large amount of polybutene was blended. The value of Ge/Gc was 119% in each case.

Comparative Examples 10A, 11A, and Examples 10A, 11A

In Table 3A, in Comparative Examples 10A, 11A, Examples 10A and 11A, the SIBS was used for the first layer, the SIS was used for the second layer, and polybutene was added to the first layer. The value of the thickness (Ge/Gc) of the thick portion was varied. The values of Ge/Gc in Comparative Examples 10A and 11A were as low as 12.5% and 67%, respectively.

Comparative Examples 12A, 13A and Examples 12A, 13A

In Table 3A, in Comparative Examples 12A, 13A, Examples 12A and 13A, the SIBS was used for the first layer, the SIB was used for the second layer, and polybutene was added to the first layer. The value of the thickness (Ge/Gc) of the thick portion was varied. The values of Ge/Gc in Comparative Examples 12A and 13A were as low as 12.5% and 67%, respectively.

<Performance Test>

A performance test was conducted by the following method. It is noted that as for the performance of pneumatic tires, the following performance evaluation was carried out using tires of size of 195/65R15.

<Adhesive Strength of Layer Stack>

A test piece was produced in conformance with JIS-K-6256 "Rubber, vulcanized or thermoplastic—Determination of adhesion test." A sheet of a polymer layer stack and a rubber sheet were bonded together and vulcanized. After vulcanization, peel force at the bonding interface was measured. Peel force is indicated by an index as a relative value with respect to Comparative Example 1. A larger value is more excellent.

<Rolling Resistance>

A viscoelasticity spectrometer VES (IWAMOTO Quartz Glass Lab Co., Ltd.) was used to measure tan δ of each blend under the conditions of a temperature of 70° C., an initial strain of 10% and a dynamic strain of 2%, and the rolling resistance was indicated by an index by the following equation assuming tan δ of Comparative Example 1 as 100. As the index is larger, the rolling resistance is more excellent.

Rolling Resistance Index=(tan δ of Comparative Example 1A)/(tan δ of each Comparative Example and Each Example)×100

<Low Temperature Durability>

As a low temperature durability test, a measurement was conducted at an ambient temperature of −20° C. setting a tire air pressure at 120 kPa, a load factor at 60% and a speed at 80 km/h. As the low temperature durability shown in the drawing, the running distance when cracks occurred in the inner liner was measured, and is indicated by an index with Comparative Example 1A being regarded as a reference. As the numerical value is larger, the low temperature durability is more excellent.

<Static Air Decreasing Ratio>

Each pneumatic tire of 195165R15 size was assembled to a JIS specification rim, air was introduced thereinto at an initial air pressure of 300 kPa. The tire was left for 90 days at a room temperature. Then, decreasing ratio of air pressure was calculated as a value of static air decreasing ratio.

<Presence or Absence of Air-In>

The appearance of the tire inside after vulcanization was checked to inspect the presence/absence of air-in portions. When three or more air-in portions of a size less than or equal to 5 mm are present or an air-in portion exceeding 5 mm is present, it is determined that air-in portions are "present." Otherwise, it is determined that air-in portions are "absent."

<Result of Performance Evaluation>

The results of Examples 1A to 3A and Comparative Examples 1A to 5A reveal that they are excellent in characteristics of adhesive strength, rolling resistance, low temperature durability, static air decreasing ratio, and air-in of the layer stack. The values of Examples 4A to 6A and Comparative Examples 6A and 7A reveal that Examples of the present invention are all excellent in characteristics of rolling resistance, low temperature durability, static air decreasing ratio, and air-in. The values of Examples 7A to 9A and Comparative Examples 8A and 9A reveal that Examples of the present invention are all excellent in characteristics of rolling resistance, low temperature durability, static air decreasing ratio, and air-in. The values of Examples 10A, 11A, Comparative Examples 10A and 11A reveal that Examples of the present invention are all excellent in characteristics of rolling resistance, low temperature durability, static air decreasing ratio, and air-in.

The values of Examples 12A and 13A and Comparative Examples 12A and 13A reveal that Examples of the present invention are all excellent in characteristics of rolling resistance, low temperature durability, static air decreasing ratio, and air-in.

Example B

Pneumatic tires of Examples and Comparative Examples were manufactured according to the specifications shown in Table 1B, and tire performance was evaluated. Here, the SIB, the SIBS and the SIS used for the first and second layers were prepared as follows.

<SIB>

The same SIB as in Example A was used.

<SIBS>

"SIBSTAR 102 (Shore A hardness: 25; the content of the styrene component: 25 mass %; weight average molecular weight: 100,000)" provided by Kaneka Corporation was used.

<SIS>

D1161JP (the content of the styrene component: 15 mass %; weight average molecular weight: 150,000) provided by Kraton Polymers was used.

<Organic Derivative of Layered Clay Mineral>

"BENTONE 34" provided by Rheox Inc. was used. Here, a layered clay mineral is a hectorite clay mineral, and an organic compound is dimethyldistearyl ammonium salt. The cation exchange amount of the organic compound is 100 meg/100 g.

<Manufacturing of Pneumatic Tire>

Each tire was provided by the same method as in Example A.

TABLE 1B

| | | | Examples | | | | | | |
|---|---|---|---|---|---|---|---|---|---|
| | | | 1B | 2B | 3B | 4B | 5B | 6B | 7B |
| Inner Liner Structure | First Layer | SIBS (parts by mass) | 100 | 100 | 100 | 100 | 100 | 100 | 100 |
| | | Organic Derivative of Layered Clay Mineral (parts by mass) | 0.1 | 0.1 | 30 | 30 | 50 | 30 | 50 |
| | Second Layer | SIS (parts by mass) | 100 | — | 100 | — | 100 | 100 | 100 |
| | | SIB (parts by mass) | — | 100 | — | 100 | — | — | — |
| | First Layer | Thickness (mm) | 0.7 | 0.7 | 0.6 | 0.6 | 0.4 | 0.9 | 0.6 |
| | Second Layer | Thickness (mm) | 0.2 | 0.2 | 0.2 | 0.2 | 0.1 | 0.2 | 0.2 |
| | | Thickness of Thick Portion (mm) | 1.7 | 1.7 | 1.6 | 1.8 | 1.5 | 2.1 | 1.8 |
| | | Thickness Deviation Range wc/ws (%) | 10/20 | 10/20 | 10/20 | 10/20 | 10/20 | 10/20 | 10/20 |
| | | Thickness Ratio (Ge/Gc) (%) | 189 | 189 | 200 | 225 | 300 | 191 | 225 |
| Labo Test | | Tensile Breaking Strength (@100° C., MPa) | 2.3 | 2.3 | 3.5 | 3.5 | 4.9 | 3.8 | 4.9 |
| | | Tensile Breaking Elongation (@100° C., %) | 653 | 653 | 627 | 627 | 558 | 625 | 540 |
| | | Flection Fatigue (number of times × $10^4$/mm) | 4000 | 4000 | 7000 | 7000 | 5000 | 7000 | 5000 |
| | | The amount of Air Permeation ($\times 10^{-11} \cdot cm^3 \cdot cm/cm^2 \cdot S \cdot cm \cdot Hg$) | 4.3 | 4.3 | 3.8 | 3.8 | 3.5 | 3.2 | 3 |
| Performance Evaluation | | Rolling Resistance (index) | 100 | 100 | 112 | 110 | 115 | 106 | 104 |
| | | Static Air Decreasing Ratio (%/month) (index) | 111 | 111 | 108 | 110 | 106 | 113 | 115 |
| | | Overall Evaluation | B | B | A | A | A | A | A |

| | | | Examples | | Comparative Examples | | | |
|---|---|---|---|---|---|---|---|---|
| | | | 8B | 9B | 1B | 2B | 3B | 4B |
| Inner Liner Structure | First Layer | SIBS (parts by mass) | 100 | 100 | 80(20) | 100 | 100 | 100 |
| | | Organic Derivative of Layered Clay Mineral (parts by mass) | 50 | 50 | 0 | 0 | 0 | 80 |

TABLE 1B-continued

|  |  |  |  |  |  |  |  |
|---|---|---|---|---|---|---|---|
|  | Second Layer | SIS (parts by mass) | 100 | 50 | 100 | 100 | 50 | — |
|  |  | SIB (parts by mass) | — | 50 | — | — | 50 | 100 |
|  | First Layer | Thickness (mm) | 0.6 | 0.6 | 0.8 | 0.7 | 1.2 | 2.0 |
|  | Second Layer | Thickness (mm) | 0.2 | 0.2 | 0.2 | 0.2 | 0.3 | 0.4 |
|  | Thickness of Thick Portion (mm) |  | 1.8 | 1.8 | — | 1.7 | 2.0 | 3.0 |
|  | Thickness Deviation Range wc/ws (%) |  | 10/30 | 10/20 | — | 10/20 | 10/20 | 10/20 |
|  | Thickness Ratio (Ge/Gc) (%) |  | 225 | 225 | — | 189 | 133 | 125 |
| Labo Test | Tensile Breaking Strength (@100° C., MPa) |  | 4.9 | 4.9 | 4.0 | 1.5 | 2.0 | 1.2 |
|  | Tensile Breaking Elongation (@100° C., %) |  | 540 | 540 | 650 | 650 | 650 | 400 |
|  | Flection Fatigue (number of times × 10$^4$/mm) |  | 5000 | 5000 | 9000 | 2000 | 2000 | 1500 |
|  | The amount of Air Permeation (×10$^{-11}$ · cm$^3$ · cm/cm$^2$ · S · cm · Hg) |  | 1.5 | 3 | 12.2 | 4.5 | 4.5 | 3.5 |
| Performance Evaluation | Rolling Resistance (index) |  | 101 | 104 | 100 | 65 | 50 | 40 |
|  | Static Air Decreasing Ratio (%/month) (index) |  | 120 | 115 | 100 | 75 | 80 | 82 |
|  | Overall Evaluation |  | A | A | C | D | D | D |

(*1) In Table 1B, "Thickness Deviation Range (wc/ws) (%)" represents a rate wc (%) of a distance extending toward crown central position Pc with respect to shoulder position Pe to Wc and a rate ws (%) of a distance extending toward largest width position Ps with respect to shoulder position Pe to Ws.
(*2) In Table 1B, Thickness Ratio (Ge/Gs) of the thick portion has the same value as (Ge/Gc).

<Performance Test>

A performance test was conducted by the following method. It is noted that as for the performance of pneumatic tires, the following performance evaluation was carried out using tires of size of 195/65R15.

(a) High Temperature Tensile Test

In conformance with JIS-K-6251 "Rubber, vulcanized or thermoplastics—Determination of tensile stress-strain properties", No. 3 dumbbell-shaped test pieces made of a thermoplastic sheet and a vulcanized rubber sheet were used and left for 2 minutes in a temperature atmosphere of 100° C., and then a tensile test was conducted to measure tensile breaking strength and tensile breaking elongation of each test piece.

(b) Flection Fatigue Test

In conformance with JIS-K-6260 "Rubber, vulcanized or thermoplastic—Determination of flex cracking and crack growth (De Mattia type)", a predetermined test piece having a slot at its center was produced. As an inner liner made of a thermoplastic resin, a 0.3-mm-thick sheet was bonded to rubber and vulcanized to produce a predetermined test piece. The slot of the test piece was cut at its center beforehand, and repeated flection deformation was given. Crack growth was measured.

Crack length was measured at an ambient temperature of 30° C., a strain of 30%, a frequency of 5 Hz, at the 700,000th time, the 1,400,000th time and the 2,100,000 time, and the number of times of repetition taken for a crack to grow 1 mm was calculated. The unit is the number of times×10$^4$/mm. It can be said that as the numerical value is larger, a crack is less likely to grow, which is favorable.

(c) Air Permeability Test

In conformance with ASTM-D-1434-75M method, the amount of air permeation through the thermoplastic resin sheet and the vulcanized rubber sheet was measured. The numerical values of less than or equal to 10, particularly less than or equal to 5 indicate that the amount of air permeation is smallest and air barrier property is favorable.

(d) Rolling Resistance

A steel radial tire of size of 195/65R15 was assembled to a JIS specification rim 15×6JJ, and a rolling resistance tester provided by Kobe Steel, Ltd. was used to measure rolling resistance thereof after traveling at a room temperature (38° C.) under conditions of a load of 3.4 kN, an air pressure of 230 kPa, and a speed of 80 km/h. By the following equation, rolling resistance of each Example and Comparative Example was indicated by an index (%) with Comparative Example 1 used as a reference. It is noted that a larger rolling resistance index indicates that the rolling resistance is further reduced.

(Rolling Resistance Index)=(Rolling Resistance of Comparative Example 1)/(Rolling Resistance of each Example)×100

(e) Static Air Decreasing Ratio

Each pneumatic tire of size of 195/65R15 was assembled to a JIS specification rim 15×6JJ, and air was introduced thereinto at an initial air pressure of 300 Kpa. Then, the tire was left for 90 days at a room temperature. Then, decreasing ratio of air pressure was calculated as the value of static air decreasing ratio.

<Overall Evaluation>

An overall evaluation was made in accordance with the following method.

A tire superior to Comparative Example 1 in all of the performance evaluations of the above items (c) to (e) and having the value of (b) exceeding 5000 times×10$^4$/mm was evaluated as "A".

A tire superior to Comparative Example 1 in all of the performance evaluations of the above items (c) to (e) and having the value of (b) exceeding 4000 to 5000 times×10$^4$/mm was evaluated as "B".

Comparative Examples 1B to 4B, Examples 1B to 9B

In Comparative Example 1, a composite obtained by blending the SIBS by 80 parts by mass and NR by 20 parts by mass into the first layer (the blending amount is indicated in parenthesis in Table 1) was used. In each of Comparative Examples 1B to 3B, an organic derivative of layered clay mineral was not blended. In Comparative Example 4B, an organic derivative of layered clay mineral was blended by 80 parts by mass.

In Comparative Examples 1B to 4B, the amount of air permeation is large irrespective of the large thickness of the inner liner, and the static air decreasing ratio is low. The rolling resistance changing ratio also presents a low value.

Examples 1B to 9B presents excellent flex fatigue resistance, a small amount of air permeation, and excellent performance in rolling resistance changing ratio and static air decreasing ratio, as compared with Comparative Examples 2B to 4B each having a thick portion. Comparative Example 1 is excellent in flex fatigue resistance, but the amount of air permeation is large.

Example C

Table 1C shows formulations (A1 to A5) of the first layer of a polymer layer stack, and Table 2C shows formulations (B1 to B6) of the second layer of a polymer layer stack. Pneumatic tires of Example C and Comparative Example C were manufactured in accordance with the specifications shown in Table 3C combining the formulations of the above-described first and second layers, and tire performance was evaluated. Here, the polymer components and compounding agents used for the polymer composition of the first and second layers are as follows.

TABLE 1C

Formulation of First Layer

|  |  | Example Formulation | | Comparative Formulation | | |
|---|---|---|---|---|---|---|
|  |  | A1 | A2 | A3 | A4 | A5 |
| Formulation (parts by mass) | IIR (*1) | 60 | 95 | — | 50 | 98 |
|  | SIBS (*2) | 40 | 5 | 100 | 50 | 2 |
|  | Stearic acid (*3) | 3 | 3 | 3 | 3 | 3 |
|  | Zinc Oxide (*4) | 5 | 5 | 5 | 5 | 5 |
|  | Antioxidant (*5) | 1 | 1 | 1 | 1 | 1 |
|  | Vulcanization Accelerator (*6) | 1 | 1 | 1 | 1 | 1 |
|  | Sulfur (*7) | 0.5 | 0.5 | 0.5 | 0.5 | 0.5 |

TABLE 2C

Formulation of Second Layer

|  |  | Example Formulation | | | | Comparative Formulation | |
|---|---|---|---|---|---|---|---|
|  |  | B1 | B2 | B3 | B4 | B5 | B6 |
| Formulation (parts by mass) | SIS (*8) | 10 | — | 80 | 85 | 100 | — |
|  | SIB (*9) | — | 10 | — | — | — | 100 |
|  | Butyl Rubber (*10) | 90 | 90 | 20 | 15 | — | — |

TABLE 2C-continued

Formulation of Second Layer

|  | Example Formulation | | | | Comparative Formulation | |
|---|---|---|---|---|---|---|
|  | B1 | B2 | B3 | B4 | B5 | B6 |
| Stearic Acid (*3) | 3 | 3 | 3 | 3 | 3 | 3 |
| Zinc Oxide (*4) | 5 | 5 | 5 | 5 | 5 | 5 |
| Antioxidant (*5) | 1 | 1 | 1 | 1 | 1 | 1 |
| Vulcanization Accelerator (*6) | 1 | 1 | 1 | 1 | 1 | 1 |
| Sulfur (*7) | 0.5 | 0.5 | 0.5 | 0.5 | 0.5 | 0.5 |

(*1) IIR: "Exxon Chlorobutyl 1066" provided by Exxon Mobil Corporation
(*2) SIBS: "SIBSTAR 102T" provided by Kaneka Corporation (a styrene-isobutylene-styrene triblock copolymer having a weight-average molecular weight of 100,000, a styrene unit content of 25% by mass, and a Shore A hardness of 25)
(*3) Stearic Acid: "Stearic Acid Lunac S30" provided by Kao Corporation
(*4) Zinc Oxide: "Zinc White No. 1" provided by Mitsui Mining & Smelting Co., Ltd.
(*5) Antioxidant: "Noclac 6C" (N-(1,3-dimethylbutyl)-N'-phenyl-p-phenylenediamine) provided by Ouchi Shinko Chemical Industrial Co., Ltd.
(*6) Vulcanization Accelerator: "Nocceler DM" (di-2-benzothiazolyldisulfide) provided by Ouchi Shinko Chemical Industrial Co., Ltd.
(*7) Sulfur: "Sulfur Powder" provided by Tsurumi Chemical Industry Co., Ltd.
(*8) SIS: "D1161JP" provided by Kraton Performance Polymers Inc. (a styrene-isoprene-styrene triblock copolymer having a weight-average molecular weight of 150,000 and a styrene unit content of 15% by mass)
(*9) SIB: the same SIB used in Example A was used.
(*10) Butyl Rubber: "Exxon Chlorobutyl 1066" provided by Exxon Mobil Corporation <Manufacturing of Pneumatic Tire>

Each tire was manufactured by a method similar to that of Example A.

TABLE 3C

|  |  | Example 1C | Example 2C | Example 3C | Example 4C | Example 5C | Example 6C | Example 7C |
|---|---|---|---|---|---|---|---|---|
| First Layer | Layer Thickness (mm) | 0.25 | 0.25 | 0.25 | 0.25 | 0.25 | 0.25 | 0.25 |
|  | Formulation Used | A1 | A1 | A1 | A1 | A2 | A2 | A2 |
| Second Layer | Layer Thickness (mm) | 0.05 | 0.05 | 0.05 | 0.05 | 0.05 | 0.05 | 0.05 |
|  | Formulation Used | B1 | B1 | B3 | B3 | B2 | B2 | B4 |
| Thick Portion | Thickness Ge (mm) | 0.36 | 1.5 | 0.36 | 1.5 | 0.3 | 1.8 | 1.8 |
|  | Thickness Ratio Ge/Gc (%) | 120 | 500 | 120 | 500 | 120 | 500 | 500 |
|  | Range (wc/ws) (%) | 10/20 | 10/20 | 10/20 | 10/20 | 10/20 | 10/20 | 10/20 |
| (a) Index of Vulcanization Adhesive Strength between First and Second Layers |  | 200 | 200 | 220 | 220 | 210 | 210 | 218 |
| (b) Static Air Decreasing Ratio (%/month) |  | 2.2 | 2.1 | 2.4 | 2.3 | 2.2 | 2.1 | 2.1 |
| (c) Low Temperature Durability (index) |  | 116 | 130 | 110 | 125 | 110 | 120 | 108 |
| (d) Rolling Resistance (index) |  | 104 | 101 | 106 | 103 | 104 | 101 | 104 |
| Overall Evaluation |  | A | A | A | A | A | A | A |

TABLE 4C

| | | Comparative Example 1C | Comparative Example 2C | Comparative Example 3C | Comparative Example 4C | Comparative Example 5C | Comparative Example 6C | Comparative Example 1C | Comparative Example 8C | Comparative Example 9C | Comparative Example 10C |
|---|---|---|---|---|---|---|---|---|---|---|---|
| First layer | Layer thickness (mm) | 0.25 | 0.25 | 0.25 | 0.25 | 0.25 | 0.25 | 0.25 | 0.25 | 0.25 | 0.25 |
| | Formulation Used | A1 | A1 | A1 | A1 | A2 | A3 | A3 | A4 | A4 | A5 |
| Second layer | Layer thickness (mm) | 0.05 | 0.05 | 0.05 | 0.05 | 0.05 | 0.05 | 0.05 | 0.05 | 0.05 | 0.05 |
| | Formulation Used | B1 | B1 | B3 | B3 | B2 | B1 | B5 | B5 | B6 | B5 |
| Thick portion | Thickness Ge (mm) | 0.3 | 1.8 | 0.3 | 1.8 | 1.8 | 0.3 | 0.3 | 1.8 | 0.3 | 1.8 |
| | Thickness Ratio Ge/Gc (%) | 100 | 600 | 100 | 600 | 600 | 100 | 100 | 120 | 100 | 120 |
| | Range (wc/ws) (%) | 10/20 | 10/20 | 10/20 | 10/20 | 10/20 | 10/20 | 10/20 | 10/20 | 10/20 | 10/20 |
| (a) Index of Vulcanization Adhesive Strength between First and Second Layers | | 200 | 200 | 220 | 220 | 210 | 100 | 100 | 120 | 130 | 170 |
| (b) Static air Decreasing Ratio (%/month) | | 2.3 | 2.0 | 2.4 | 2.2 | 2.1 | 1.9 | 2.3 | 2.5 | 2.5 | 2.6 |
| (c) Low Temperature Durability (index) | | 100 | 135 | 100 | 130 | 150 | 100 | 100 | 130 | 100 | 132 |
| (d) Rolling Resistance (index) | | 105 | 99 | 107 | 99 | 99 | 104 | 100 | 105 | 105 | 104 |
| Overall Evaluation | | B | B | B | B | B | B | B | B | B | B |

(*1) In Tables 3C and 4C, "Range (wc/ws) (%)" represents a rate wc (%) of a distance extending toward crown central position Pc with respect to shoulder position Pe to Wc and a rate ws (%) of a distance extending toward largest width position Ps with respect to shoulder position Pe to Ws.

(*2) In Tables 3C and 4C, Thickness Ratio (Ge/Gs) of the thick portion has the same value as (Ge/Ge).

<Performance Test>

A performance test was conducted by the following method. It is noted that the performance of pneumatic tire was evaluated using a tire of size of 195/65R15.

(a) Index of Vulcanization Adhesive Strength Between First and Second Layers

Each polymer layer stack was heated at 170° C. for 20 minutes to obtain a sample for measuring vulcanization adhesive strength. Peel force was measured by a tensile peel test to obtain vulcanization adhesive strength. The vulcanization adhesive strength of each example formulation was indicated by an index by the following equation using Comparative Example 7 as a reference (100). As the vulcanization adhesive strength index is larger, the vulcanization adhesive strength is stronger.

(Vulcanization Adhesive Strength Index)=(Vulcanization Adhesive Strength of Each Example Formulation)/(Vulcanization Adhesive Strength of Comparative Example 7C)×100

(b) Static Air Decreasing Ratio

Each pneumatic tire of size of 195/65R15 was assembled to a JIS specification rim 15×6JJ, and air was introduced thereinto at an initial air pressure of 300 KPa. Then, the tire was left for 90 days at a room temperature. Then, decreasing ratio of air pressure was calculated as the value of static air decreasing ratio.

(c) Low Temperature Durability

At an ambient temperature of −20° V, the running distance when a crack occurred in the inner liner was measured setting a tire air pressure at 120 kPa, a load factor at 60(%), and a speed at 80 km/h. A relative value was indicated by an index with the running distance in Comparative Example 7C being regarded as 100.

(d) Rolling Resistance

Each steel radial tire of size of 195/65R15 was assembled to a JIS specification rim 15×6JJ, and a rolling resistance tester provided by Kobe Steel Ltd was used to measure rolling resistance thereof after traveling at a room temperature (38° C.) under conditions of a load of 3.4 kN, an air pressure of 230 kPa and a speed of 80 km/h. The rolling resistance of each Example and each Comparative Example was indicated by an index by the following equation using Comparative Example 7 as a reference. It shows that as the index value is larger, the rolling resistance is further reduced.

Rolling Resistance (Index)=(Rolling Resistance of Comparative Example 7C)/(Rolling Resistance of Each Example)×100

<Overall Evaluation>

Overall evaluation was conducted based on the respective performance evaluations (a) to (d). Criteria for overall evaluation A and overall evaluation B are as follows.

Overall Evaluation A

Items (a) to (d) satisfy all the following conditions.

(a) The index of vulcanization adhesive strength between the first and second layers is larger than 100.

(b) The static air decreasing ratio is smaller than 2.5.

(c) The low temperature durability (index) is larger than 100.

(d) The rolling resistance (index) is larger than 100.

Overall Evaluation B

Any of items (a) to (d) satisfy one of the following conditions.

(a) The index of vulcanization adhesive strength between the first and second layers is less than or equal to 100.

(b) The static air decreasing ratio is more than or equal to 2.5.

(c) The low temperature durability (index) is less than or equal to 100.

(d) The rolling resistance (index) is less than or equal to 100.

Examples 1C to 7C

In Table 3C, Examples 1C and 2C are pneumatic tires in which a polymer layer stack with a polymer composition of formulation A1 used as the first layer and a polymer composition of formulation B1 used as the second layer is used. The thickness (Ge) of the thick portion is 0.36 mm in Example 1 and 1.5 mm in Example 2.

In each of the polymer layer stacks of Examples 1C and 2C, the polymer layer stack of the first and second layers had a vulcanization adhesive strength index of 200, which exhibited excellent characteristics. Each pneumatic tire also exhibited excellent performance in all of static air decreasing ratio, low temperature durability and rolling resistance.

Examples 3C and 4C are pneumatic tires in which a polymer layer stack with a polymer composition of formulation A1 used as the first layer and a polymer composition of formulation B3 used as the second layer is used. The thickness (Ge) of the thick portion and the thickness ratio (Ge/Gc) are different. In each of the polymer layer stacks of Examples 3C and 4C, the polymer layer stack of the first and second layers had a vulcanization adhesive strength index of 220, which exhibited excellent characteristics. Each pneumatic tire also exhibited excellent performance in all of static air decreasing ratio, low temperature durability and rolling resistance.

Examples 5C and 6C are pneumatic tires in which a polymer layer stack with a polymer composition of formulation A2 used as the first layer and a polymer composition of formulation B2 used as the second layer is used. The thickness (Ge) of the thick portion and the thickness ratio (Ge/Gc) are different. In each of the polymer layer stacks of Examples 5C and 6C, the polymer layer stack of the first and second layers had a vulcanization adhesive strength index of 210, which exhibited excellent characteristics. Each pneumatic tire also exhibited excellent performance in all of static air decreasing ratio, low temperature durability and rolling resistance.

Example 7C is a pneumatic tire in which a polymer layer stack with a polymer composition of formulation A2 used as the first layer and a polymer composition of formulation B4 used as the second layer is used. In the polymer layer stack of Example 7C, the polymer layer stack of the first and second layers had a vulcanization adhesive strength index of 218, which exhibited excellent characteristics. The pneumatic tire also exhibited excellent performance in all of static air decreasing ratio, low temperature durability and rolling resistance.

Comparative Examples 1C to 10C

In Table 4, Comparative Example 1C is a pneumatic tire in which a polymer layer stack with a polymer composition of formulation A1 used as the first layer and a polymer composition of formulation B1 used as the second layer is used. In the polymer layer stack of Comparative Example 1C, the polymer layer stack of the first and second layers had a vulcanization adhesive strength index of 200, which exhibited excellent characteristics. The pneumatic tire also exhibited satisfactory performance in static air decreasing ratio and rolling resistance. However, low temperature durability was at the same level as Comparative Example 7C, which was insufficient performance.

Comparative Example 2C is a pneumatic tire in which a polymer layer stack with a polymer composition of formulation A1 used as the first layer and a polymer composition of formulation B1 used as the second layer is used. In the polymer layer stack of Comparative Example 2C, the polymer layer stack of the first and second layers had a vulcanization adhesive strength index of 200, which exhibited excellent characteristics. The pneumatic tire exhibited satisfactory performance in static air decreasing ratio. However, the tire was inferior to Comparative Example 7C in rolling resistance although superior to Examples 1C and 2C in low temperature durability.

Comparative Examples 3C and 4C are pneumatic tires in which a polymer layer stack with a polymer composition of formulation A1 used as the first layer and a polymer composition of formulation B1 used as the second layer is used. In each of the polymer layer stacks, the polymer layer stack of the first and second layers had a vulcanization adhesive strength index of 220, which exhibited excellent characteristics. Each pneumatic tire also exhibited satisfactory performance in static air decreasing ratio. Improvement in low temperature durability was not observed in Comparative Example 3, and Comparative Example 4C is inferior in rolling resistance.

Comparative Example 5C is a pneumatic tire in which a polymer layer stack with a polymer composition of formulation A2 used as the first layer and a polymer composition of formulation B2 used as the second layer is used. The polymer layer stack of the first and second layers had a vulcanization adhesive strength index of 210, which exhibited excellent characteristics. However, the pneumatic tire is inferior in static air decreasing ratio and rolling resistance.

Comparative Examples 6C to 10C all use polymer compositions for the first and second layers different from the polymer compositions of the present invention. They are inferior in all of vulcanization adhesive strength index, static air decreasing ratio, low temperature durability, and rolling resistance.

INDUSTRIAL APPLICABILITY

The pneumatic tire of the present invention can be used not only as a pneumatic tire for passenger car but also as a pneumatic tire for track/bus, heavy industrial machine, or the like.

REFERENCE SIGNS LIST

1 pneumatic tire; 2 tread portion; 3 sidewall portion; 4 bead portion; 5 bead core; 6 carcass ply; 7 belt layer; 8 bead apex; 9 inner liner; PL polymer layer stack; PL1 SIBS layer; PL2 SIS layer; PL3 SIB layer; Pe shoulder position; Pc crown central position; Ps tire largest width position; Te tread end.

The invention claimed is:
1. A pneumatic tire comprising an inner liner disposed on the tire inside relative to a carcass ply bridged between a pair of bead portions, wherein
    said inner liner is composed of a polymer layer stack including
    (A) a first layer made of a polymer composition containing a styrene-isobutylene-styrene triblock copolymer by more than or equal to 5 mass % and less than or equal to 40 mass % and at least one kind of rubber component selected from the group consisting of a natural rubber, an isoprene rubber and a butyl rubber by more than or equal to 60 mass % and less than or equal to 95 mass %, and
    (B) a second layer made of a polymer composition containing at least one of a styrene-isoprene-styrene triblock copolymer and a styrene-isobutylene diblock copolymer by more than or equal to 10 mass % and less than or equal to 85 mass % and containing at least one kind of rubber component selected from the group consisting of a natural rubber, an isoprene rubber and a butyl rubber by more than or equal to 15 mass % and less than or equal to 90 mass %, said second layer is arranged to come into contact with the carcass ply, and said inner liner has a thickness Ge at a shoulder position Pe being 120% to 500% of a thickness Gc at a crown central position Pc.

2. The pneumatic tire according to claim 1, wherein said first layer is a polymer composition containing blended therein sulfur by more than or equal to 0.1 part by mass and less than or equal to 5 parts by mass, stearic acid by more than or equal to 1 part by mass and less than or equal to 5 parts by mass, zinc oxide by more than or equal to 0.1 part by mass and less than or equal to 8 parts by mass, an antioxidant by more than or equal to 0.1 part by mass and less than or equal to 5 parts by mass, and a vulcanization accelerator by more than or equal to 0.1 part by mass and less than or equal to 5 parts by mass, relative to 100 parts by mass of a polymer component.

3. The pneumatic tire according to claim 1, wherein in a tire meridian section, when drawing a normal line L from a ground end Te of a tread portion inwardly in a tire radial direction relative to a boundary between said carcass ply and the inner liner and representing an intersection with said boundary by the shoulder position Pe, and representing an intersection of a tire central line CL and the intersection of said carcass ply and the inner liner by crown central position Pc, and representing a distance along a contour line of the inner liner from said shoulder position Pe to said crown central position Pc by a shoulder distance Wc, said inner liner has a thick portion formed in a region having a width of at least 10% of said shoulder distance Wc from said shoulder position Pe toward said crown central position Pc.

4. The pneumatic tire according claim 1, wherein said inner liner has a thick portion formed in a region having a width of less than or equal to 50% of said shoulder distance Wc from said shoulder position Pe toward said crown central position Pc.

5. The pneumatic tire according to claim 1, wherein, when representing a distance along a contour line of the inner liner from said shoulder position Pe to a tire largest width position Ps of said inner liner by a side distance Ws, said inner liner has a thick portion formed in a region having a width of at least 20% of said side distance Ws from said shoulder position Pe toward said largest width position Ps.

6. The pneumatic tire according to claim 1, wherein said inner liner has a thick portion formed in a region having a width of less than or equal to t100% of said side distance Ws from said shoulder position Pe toward said largest width position Ps.

7. The pneumatic tire according to claim 1, wherein said styrene-isobutylene-styrene triblock copolymer contains a styrene component at a content of 10 mass % to 30 mass %, and has a weight average molecular weight of 50,000 to 400,000.

* * * * *